United States Patent [19]
Kawamura et al.

[11] Patent Number: 5,136,642
[45] Date of Patent: Aug. 4, 1992

[54] CRYPTOGRAPHIC COMMUNICATION METHOD AND CRYPTOGRAPHIC COMMUNICATION DEVICE

[75] Inventors: Shinichi Kawamura, Kanagawa; Atsushi Shimbo, Tiba, both of Japan

[73] Assignee: Kabushiki Kaisha Toshiba, Tokyo, Japan

[21] Appl. No.: 708,361

[22] Filed: May 31, 1991

[30] Foreign Application Priority Data

Jun. 1, 1990 [JP] Japan .................................. 2-143833
Nov. 14, 1990 [JP] Japan .................................. 2-305972
Jan. 30, 1991 [JP] Japan .................................. 3-010044

[51] Int. Cl.$^5$ ............................................. H04L 9/02
[52] U.S. Cl. ............................................. 380/21; 380/30
[58] Field of Search ............................ 380/21, 44–47, 380/30

[56] References Cited

U.S. PATENT DOCUMENTS

| | | | |
|---|---|---|---|
| 4,471,163 | 9/1984 | Donald et al. | 380/47 |
| 4,876,716 | 10/1989 | Okamoto et al. | 380/21 |
| 5,001,752 | 3/1991 | Fischer | 380/30 |
| 5,005,200 | 4/1991 | Fischer | 380/30 |
| 5,022,080 | 6/1991 | Durst et al. | 380/23 |
| 5,029,208 | 7/1991 | Tanaka | 380/21 |

*Primary Examiner*—Salvatore Cangialosi
*Attorney, Agent, or Firm*—Oblon, Spivak, McClelland, Maier & Neustadt

[57] ABSTRACT

A cryptographic communication method comprises a step for carrying out cryptographic communication between a sending station and one or more receiving stations by using (1) a ciphertext formed by encrypting a unit of sending information under the intervention of at least a cryptographic key and (2) key-distribution-information produced by using at least the ciphertext, receiving station's public information, and randomized information generated in the sending station.

8 Claims, 14 Drawing Sheets

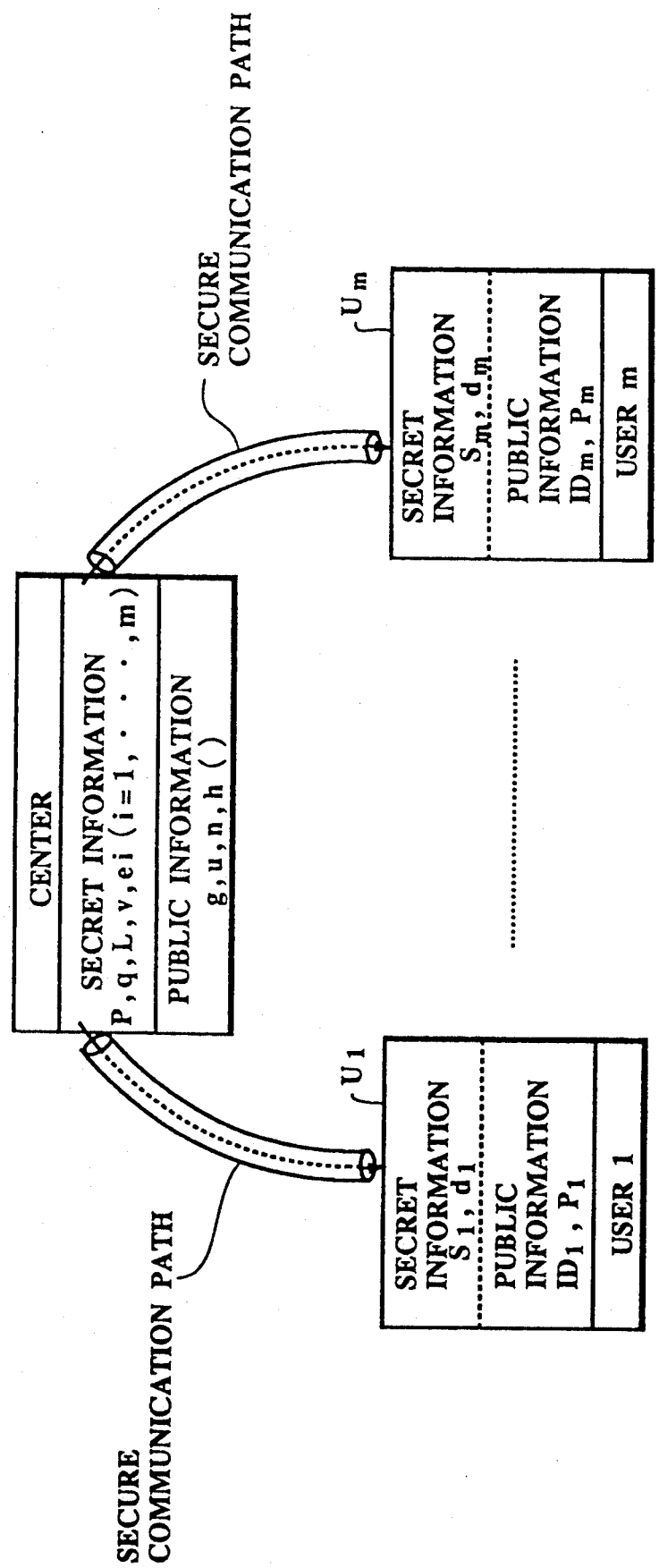

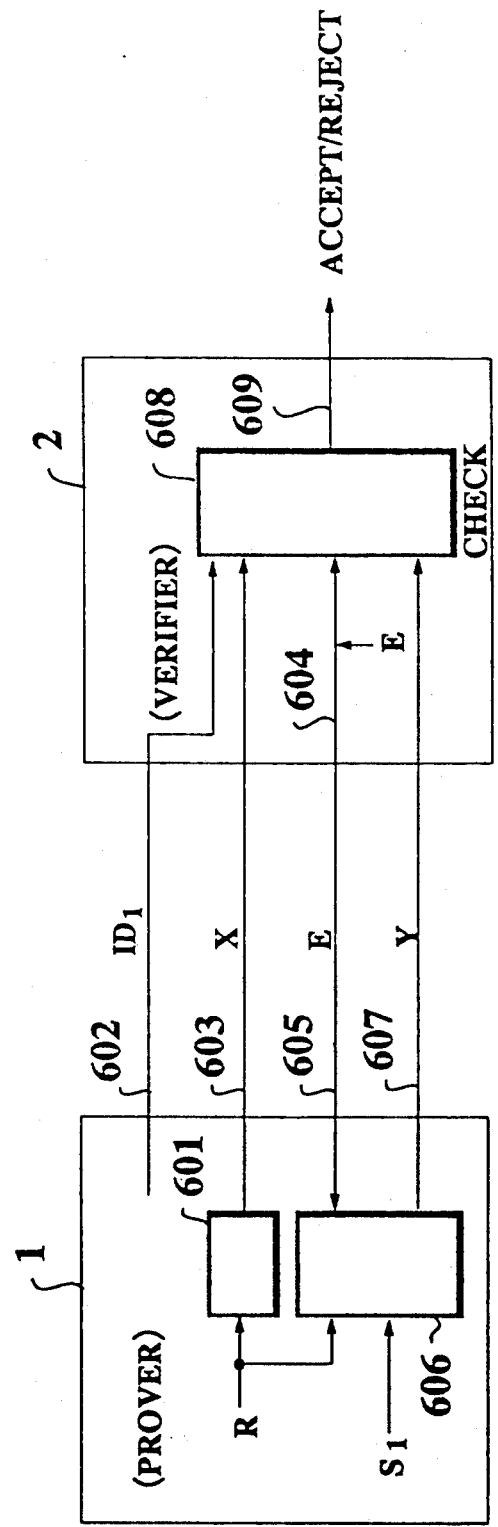

CRYPTOGRAPHIC COMMUNICATION METHOD AND CRYPTOGRAPHIC COMMUNICATION DEVICE

BACKGROUND OF THE INVENTION

1. Field of the Invention

The present invention relates to a cryptographic communication method for communicating by using cryptography and a cryptographic communication device for implementing the method, and in particular to a cryptographic communication method and device for securely distributing a cryptographic key.

2. Description of Background

Recently, many methods for protecting data with cryptography or authenticating the data have been researched and utilized for transmitting a data through an insecure communication path in which a third party can eavesdrop or alter a message.

The cryptography is classified into two kinds: a common key cryptosystem and public key cryptosystem. In particular, public key cryptography is suitable for a key sharing protocol and a digital signature. For example, the Rivest Shamir Adleman (RSA) cryptosystem and the DiffieHellman (DH) cryptosystem are commonly known.

When cryptographic communication is implemented by secret-key cryptosystem, a sender and a receiver have to share a common cryptographic key in advance. For sharing a common key, public key technique can be used. For example, the DH method (W. Diffie & M. E. Hellman, "New Directions in Cryptography" IEEE Trans. on Information Theory, IT-22, 6, pp. 644-645, June 1976) being popular is the oldest one.

The DH method is a key distribution method between two users based on the difficulty of the discrete logarithm. That is, it is difficult to find an integer x for a given g, y and p, which satisfies the following equation.

$$y = g^x \bmod p \text{ (x and g are both integers)}$$

On the other hand, it is easy to calculate y for a given integers x, g, and p.

Since the DH method was proposed, many improved cryptographic key sharing methods have been proposed. For example, in some key distribution methods, a key to be shared changes every time or an authentication function for authenticating the sender is added. Moreover, methods in which a group of two or more persons can communicate among them by distributing a key have been proposed.

Ito et al. proposed an improved key distribution method (T. Ito, T. Habutsu, I. Sasase, S. Mori "One-Way Key Distribution System Based on Identification Information Without Public Information Directory", Lecture Notes No. A-283, pp. 1-283, National Conference of the Institute of Electronics Information and Communication Engineers, March, 1990). This method has the following properties: authentication of the public key is provided. The key changes for each communication and the communication required for the key distribution is one-way from the sender to the receiver. The key distribution method realized in the one-way communication like the above proposition is suitable for a communication system in which the transmission delay is relatively large. Such a communication system is, for example, for an electronic mail system.

Moreover, as mentioned in the Ito's paper, the one-way key distribution method might have an opportunity to be extended for sharing a key among three or more persons if the shared key depends only on random numbers generated by the sender.

The Ito method is shown abstractly in FIG. 1.

As shown in FIG. 1, a cryptographic key K is generated in a key generating section 111 of a sending station 101 under the control of a random number r generated in a random number generating section 112. Then, a message M is encrypted under intervention of the cryptographic key K in an encrypting section 113. The encrypted message C is sent to a receiving station 102. Also, a unit of key-distribution-information Y is generated in a key-distribution-information generating section 114 by using both the random number r and the public information PK. The key-distribution-information Y is also sent to the receiving station 102.

In the receiving station 102, the cryptographic key K is restored by using the key-distribution-information Y and secret information SK of the receiving station 102 in a key restoration section 115. Then, the encrypted message C is decrypted to provide the plain message M under intervention of the restored key K in a decrypting section 116.

In the above configuration, when a key K is sent from the sender 101 to the receiver 102, the key-distribution-information Y must satisfy two functions as follows:

A. an authentication function in which the receiver 102 can authenticate that the key-distribution-information Y has been positively sent from a first station (that is, from the sender 101).

B. a confidentiality function for reliably sending the key Y to a specific receiver only. Besides the Ito method, many types of key distribution methods which realizes the above two functions are available. For example, in the RSA cryptograph, the authentication function is embodied by the digital signature and the confidentiality function is realized by encryption.

In more detail, by using a receiver encrypting function Er, a sender decryption function Ds, and a hash function h, the key distribution can be embodied. For example, the key-distribution-information Y is generated from the key K as shown by the following equation.

$$Y = Er(K, Ds(h(K)))$$

Where, the function Ds(h(K)) indicates the sender digital signature for the key.

The receiver 102 who has already received the key-distribution-information Y decrypts the information Y by using his own decryptoin function Dr so that the key K and the sender digital signature are obtained as shown by the following equation:

$$K, Ds(h(K)) = Dr(Y).$$

Moreover, the receiver 102 confirms the signature by using a sender encrypting function Es.

This method is used for sharing the key K between two persons. This method must be secure so long as the cryptographic key K will never be revealed to anyone else.

However, in the above method, some attack will be successful in two cases as follows.

A first case occurs when the used key K is revealed to a third party by some means after the cryptographic communication. That is, when an attacker knows the key-distribution-information Y, a encrypted mail C, and the cryptographic key K which is used for encrypting a message M to create the encrypted mail C, the attacker can encrypt a message M' by using the cryptographic key K to make a encrypted mail C', and then send both the information Y and the encrypted mail C' to the receiver 102. In this case, the receiver feels that the message M' has been sent from a true sender 101.

A second case occurs when the above method is extended to a key distribution method implemented among three or more persons as follows.

When defining a sender s and a plurality of receivers r1, r2, ---, rj, the sender s prepares key-distribution-information Yi for the receiver ri by using an encryption function Eri of the receiver ri (i=1, 2, ---, j) as Yi=Eri(K,Ds(h(K))). Thereafter, the receiver ri, who has received the key-distribution-information Yi, recovers the cryptographic key K, while authenticating that the sender is the true sender s in the same manner as the key distribution between two persons.

In this case, after the key distribution is carried out among a group of three or more persons, one of the receivers can impersonate the sender s to send a message M' to another receiver. Everyone belonging to the group can impersonate the sender s for the same reason as the first case because they know that the key corresponding to the key-distribution-information Yi (i=1, 2, ---, j) is K.

SUMMARY OF THE INVENTION

It is a first object of the present invention to provide a cryptographic communication method in which the sharing key is easily changed in contrast to the DH method so that the impersonation attack carried out by resending the key distribution information in the sharing key method between two persons or among three or more persons can be prevented. Also, it is a second object to provide a cryptographic communication device to implement the above method easily.

The first object is achieved by the provision of a cryptographic communication method, comprising:

carrying out cryptographic communication between a sending station and one or more receiving stations by using (1) a ciphertext formed by encrypting a unit of sending information under the intervention of at least a cryptographic key and (2) key-distribution-information produced by using at least the ciphertext, receiving station's public information, and randomized information generated in the sending station.

The first object is also achieved by the provision of a cryptographic communication method for carrying out cryptographic communication between a sending station and one or more receiving stations, comprising:

generating a ciphertext in the sending station by encrypting a unit of sending information under the intervention of a cryptographic key which is made based on a random number made in the sending station;

generating key-distribution-information in the sending station from at least the ciphertext, one receiving station's public information, and the random number;

sending the ciphertext and the key-distribution-information to the one receiving station;

restoring the cryptographic key in the one receiving station by using at least the ciphertext, the received key-distribution-information, and secret information held in the one receiving station; and decrypting the received ciphertext in the receiving station under the intervention of the cryptographic key to obtain the plain text sent by the sender.

The second object is achieved by the provision of a cryptographic communication device for;

carrying out cryptographic communication among a plurality of stations interconnected through a communication network;

generating a pair of public and secret information to each station; and distributing encrypted sending information by using the public and secret information from a sending station to one or more receiving stations among several stations, comprising:

random number generation means for generating random numbers in a sending station;

key-distribution-information production means for producing key-distribution-information from at least the public information relating to a receiving station, a random number generated in the random number generation means, and the sending information from the sending station;

key information production means for producing key information generated by the random number generated in the random number generation means in the sending station;

encryption means for encrypting the sending information by using the key information generated in the key information production means in the sending station;

key information restoration means for restoring the key information in the receiving station recovered from the key-distribution-information produced in the key-distribution-information production means by using the encrypted sending information and the secret information of the receiving station; and decrypting means for decrypting the encrypted sending information in the receiving station by using the key information restored in the key information restoration means.

In the above configuration, as shown in FIG. 2, a cryptographic key K is generated in a key generating section 15A of a sending station 1A under the control of random number r generated in a random number generating section 11A. Then, a message M is encrypted under intervention of the cryptographic key K in an encrypting section 17A. The encrypted message C is then sent to a key-distribution-information generating section 13A with both the random number r and the public information PK of a receiving station 2A to generate the key-distribution-information Y, while the encrypted message C is sent to the receiving station 2A. The key-distribution-information Y is sent to the receiving station 2A.

In the receiving station 2A, the cryptographic key K is restored from the key-distribution-information Y by using the encrypted message C, and secret information SK of the receiving station 2A in a key restoration section 25A. Then the encrypted message C is decrypted to provide the plain message M under the intervention of the restored key K in a decrypting section 27A.

Accordingly, because the key K is generated under the control of the random number r when the key K is shared between a sender and a receiver, the shared key K is easily changed in each communication, while the key does not change in the original DH method.

In addition, because the key K set up in a communication is dependent only on the random number generated by the sender, the key K is easily shared among three or more persons as described in an embodiment hereinafter.

Moreover, because the key-distribution-information Y for sending the key K from the sender to the receiver depends on the message M, it is very difficult for a key-distribution-information accompanied with ciphertext of message M to be reused to send another ciphertext later.

Consequently, the impersonation attack carried out by resending the key-distribution-information in the key distribution method among stations can be prevented in the present invention.

The first object is also achieved by the provision of a cryptographic communication method for carrying out cryptographic communication between a sending station and one or more receiving stations, comprising:

generating a ciphertext in the sending station by encrypting the sending information under the intervention of a cryptographic key which is produced based on a first random number made in the sending station;

generating a key-distribution-information in the sending station from at least public information in one receiving station, the first random number, and a second random number which is made in the one receiving station and sent to the sending station;

sending the ciphertext and the key-distribution-information to the one receiving station;

restoring the cryptographic key in the one receiving station by using at least the received key-distribution-information, secret information held in the one receiving station, and the second random number; and decrypting the received ciphertext in the one receiving station under the intervention of the cryptographic key to obtain the plain sending information.

The second object is also achieved by the provision of a cryptographic communication device for carrying out cryptographic communication among a plurality of stations interconnected through a communication network, generating public information and secret information corresponding to the public information in each station, and distributing encrypted sending information by using the public and secret information from a sending station to one or more receiving stations among stations, comprising:

first random number generation means for generating first random numbers in a sending station;

key-distribution-information production means for producing key-distribution-information from at least a first random number generated in the first random number generation means and a second random number;

key information production means for producing key information generated by the first random number generated in the first random number generation means in the sending station;

encryption means for encrypting the sending information by using the key information generated in the key information production means in the sending station;

second random number generation means for generating second random numbers in a receiving station;

key information restoration means for restoring the key information, in the receiving station, from the key-distribution-information produced in the key-distribution-information production means by using the second random number generated in the second random number generation means and the secret information of the receiving station; and decrypting means for decrypting the encrypted sending information in the receiving station by using the key information restored in the key information restoration means.

In the above configuration, as shown in FIG. 3, a cryptographic key K is generated in a key generating section 15B of a sending station 1B under the control of the first random number r1 generated in a random number generating section 11B. Then, a message M is encrypted under the intervention of the cryptographic key K in an encrypting section 17B. Then, the encrypted message C is sent to a receiving station 2B.

Also, the first random number r1, the public information PK of a receiving station 2B, and second random number r2 generated in a random number generating section 21B of the receiving station 2B are sent to a key-distribution-information generating section 13B to generate key-distribution-information Y. The key-distribution-information Y is sent to the receiving station 2B.

In the receiving station 2B, the cryptographic key K is restored from the key-distribution-information Y by using the second random number r2 and the secret information SK of the receiving station 2B in a key restoration section 25B. Then, the encrypted message C is decrypted to provide the decrypted message M under intervention of the restored key K in a decrypting section 27B.

Accordingly, because the key-distribution-information Y depends on the second random number r2 generated in the receiver's generating section 21B, it is difficult for the receiver 2B to reuse the key-distribution-information Y generated by the random number r2 for the other receiver later. Therefore, it is difficult for an impersonation attack to be carried out by resending the message in a group key distribution among three or more persons.

As described in an embodiment hereinafter, in the calculations of the above method, the modulus is not one prime number but the product of two prime numbers. Therefore, the provision of the function for authenticating the public information, the sender, and the message is easy. Also, the amount of memory and calculation time is saved as compared with the method in which the modulus is the product of three or more prime numbers.

The first object is also achieved by the provision of a cryptographic communication method for carrying out a cryptographic communication between a sending station and one or more receiving stations, comprising:

generating key-distribution-information in the sending station from at least the public information in one receiving station, a first random number generated in the sending station, and time information provided by a clock in the sending station;

sending the key-distribution-information and the time information; and restoring a cryptographic key in the one receiving station from the received key-distribution-information by using at least secret information held in the one receiving station, and the received time information.

The second object is also achieved by the provision of a cryptographic communication device for carrying out cryptographic communication among a plurality of stations interconnected through one communication line, generating public information and secret information corresponding to the public information in each station, and distributing encrypted sending information by using the public and secret information from a sending station to one or more receiving stations among stations, comprising:

random number generation means for generating random numbers in the sending station;

a clock for generating time information, the time information informing a sending time of the sending information;

key-distribution-information production means for producing key-distribution-information from at least a random number generated in the random number generation means, the time information generated in the clock, and the public information of a receiving station;

key information production means for producing key information generated by the random number generated in the random number generation means in the sending station;

key information restoration means for restoring the key information in the receiving station from the key-distribution-information produced in the key-distribution-information production means by using the time information generated in the clock and the secret information of the receiving station.

In the above configuration, as shown in FIG. 4, the key-distribution-information Y is generated in a key-distribution-information generating section 13C of a sending station 1C by using a random number r1 generated in a random number generating section 11C, time information t generated in a clock 18C, and public information PK of a receiving station 2C. Also, a key K is generated in a key generating section 15C by using the random number r1. The key-distribution-information Y and the time information t are sent to the receiving station 2C.

In the receiving station 2C, the key K is restored in a key restoration section 25C from the key-distribution-information Y by using the time information t and secret information SK of the receiving station 2C.

Accordingly, because the key-distribution-information Y depends on the random information r1 generated in the sender's section 11C and the sending time t, the key K is changed for each communication. In addition, it is possible to prevent an impersonation attack in which a malicious receiver impersonates the true sender by sending the key-distribution-information Y, which has been sent to that receiver at a certain time, to a victimized receiver at an other time.

BRIEF DESCRIPTION OF THE DRAWINGS

FIG. 5 shows schematically a cryptographic communication system of the first to eighth embodiments according to the present invention.

DESCRIPTION OF THE SPECIFIC EMBODIMENT

Figure 1:
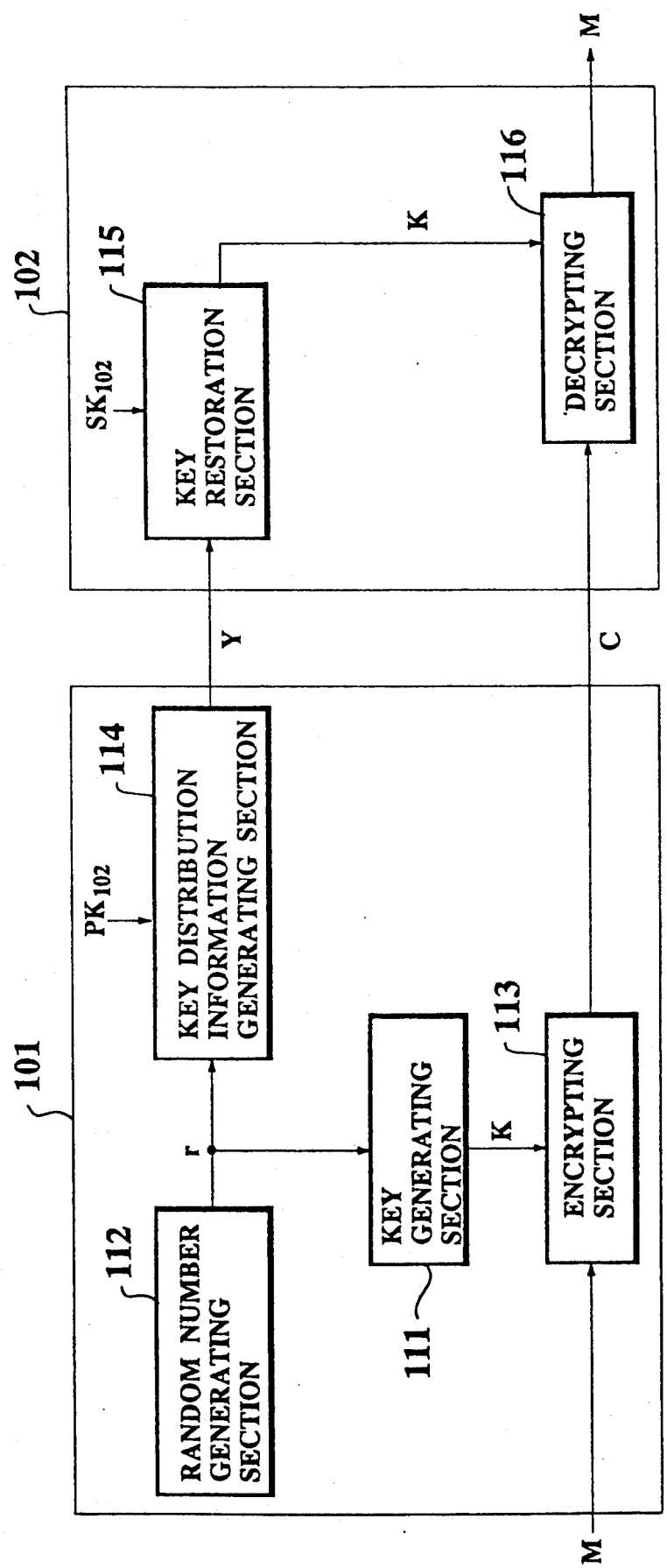
FIG. 1 is a block diagram of a conventional cryptographic communication system.
Figure 2:
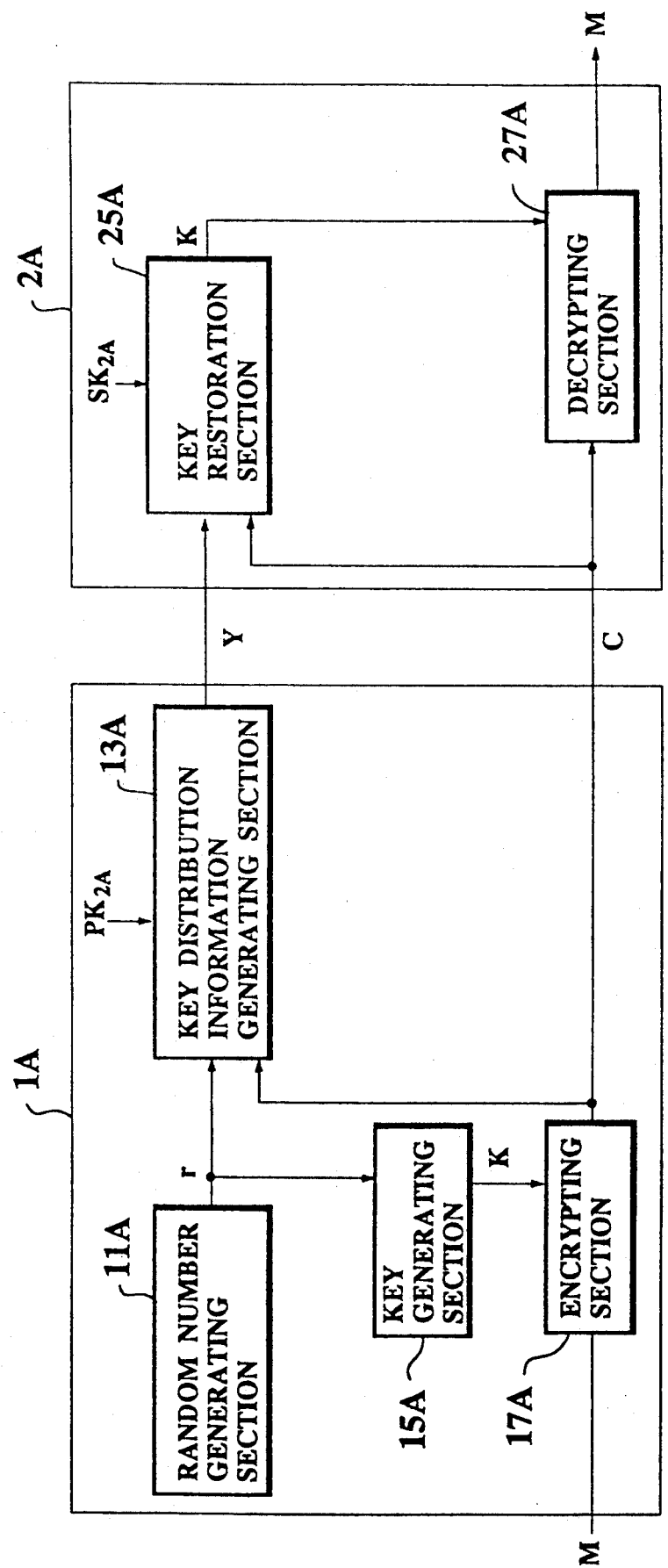
FIG. 2 is a block diagram showing basically a third to an eighth embodiment according to the present invention.
Figure 3:
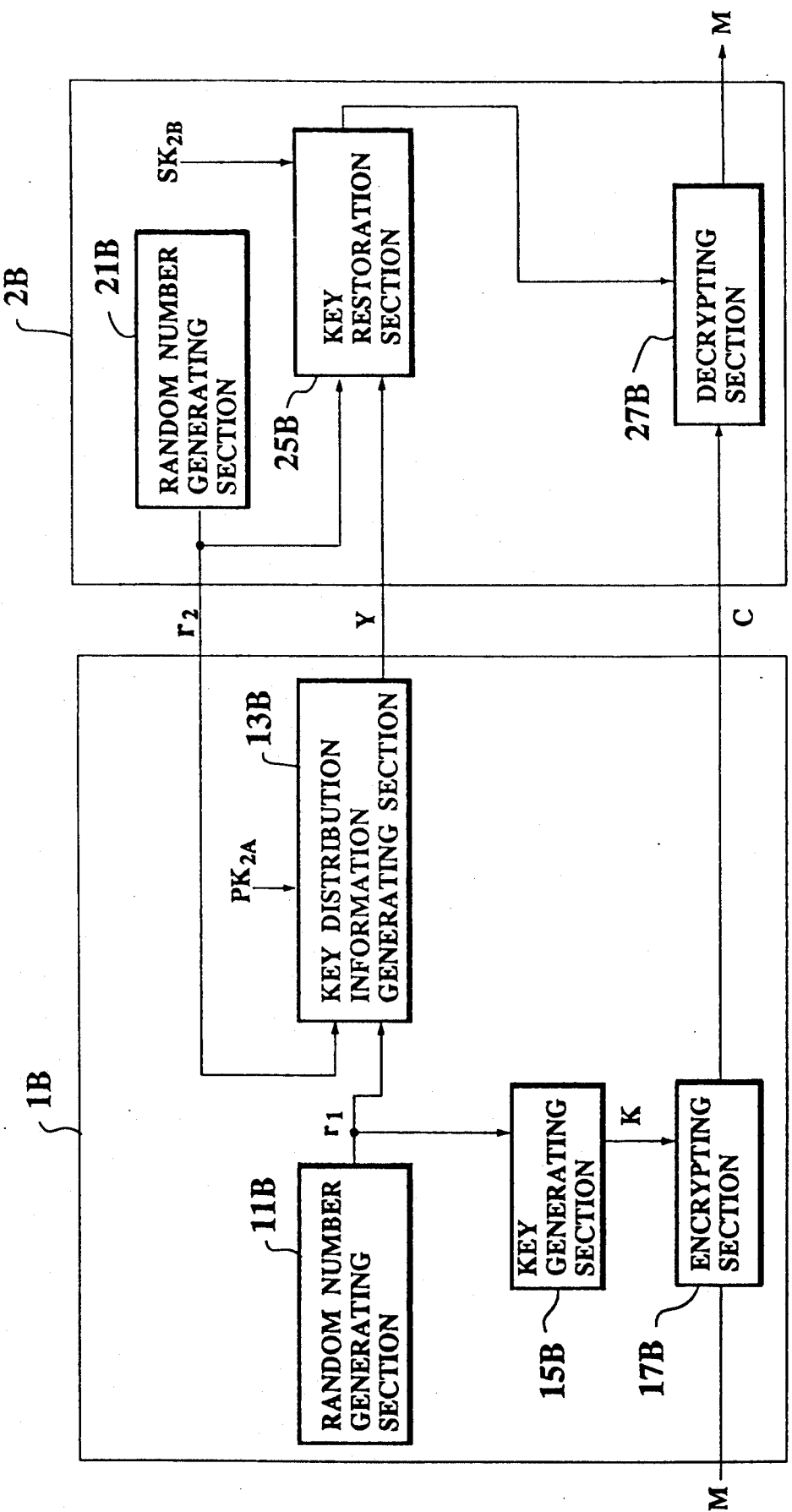
FIG. 3 is a block diagram showing basically a first embodiment according to the present invention.
Figure 4:
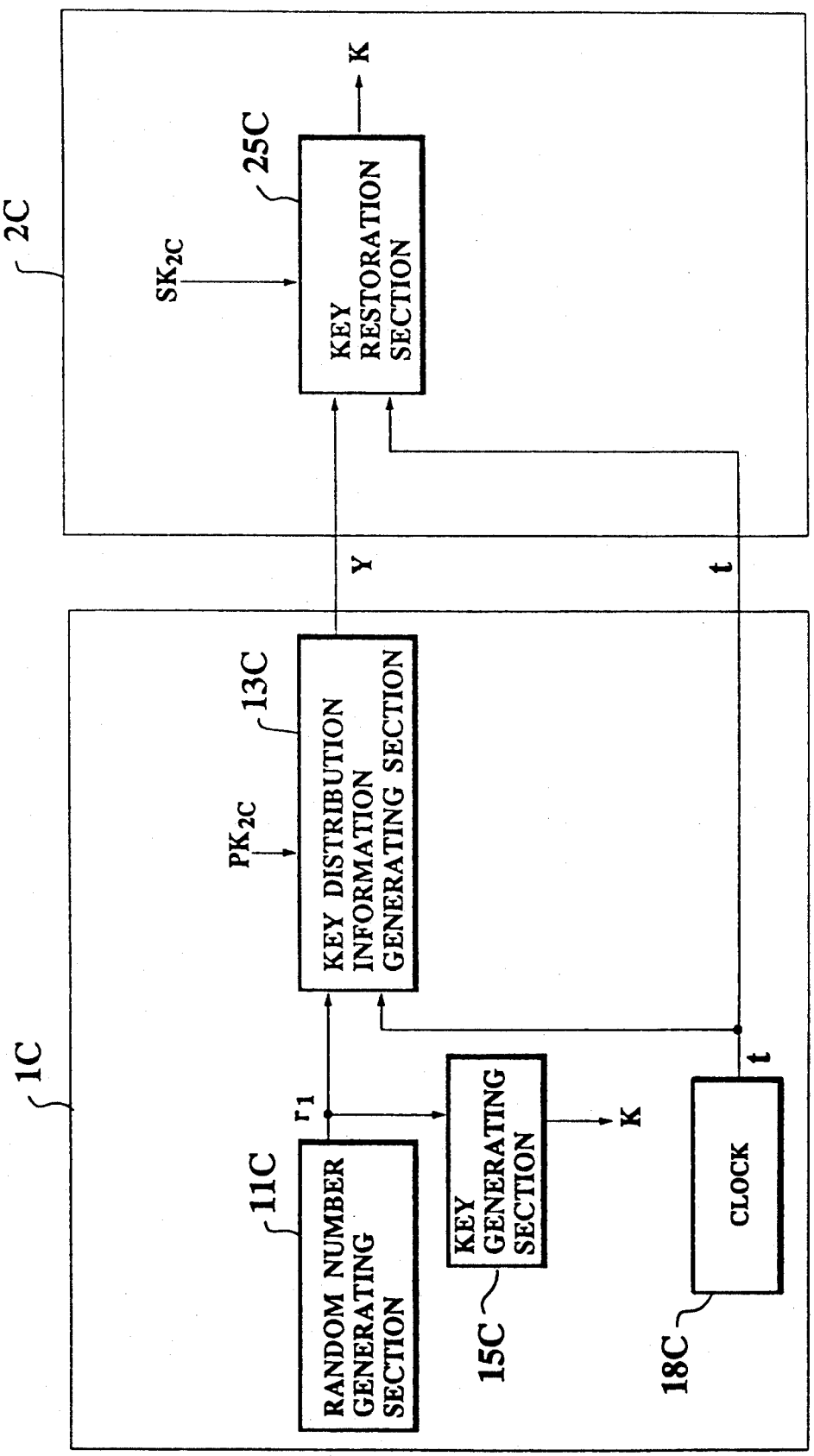
FIG. 4 is a block diagram showing basically a second embodiment according to the present invention.

Preferred embodiments are described with reference to FIG. 5 to FIG. 14.

A basic configuration of a cryptographic communication system common to all embodiments is described as follows with reference to FIG. 5.

FIG. 5 shows schematically a cryptographic communication system of the first to eighth embodiments according to the present invention.

As shown in FIG. 5, the cryptographic communication network system comprises a center for starting up the system and a plurality of stations U1 to Um which are provided corresponding to users 1 to m. Each station can be either a sending station or a receiving station as necessity requires. Each station Ui ($i=1,\cdots,m$) is provided with an identification number IDi which is set to identify one station from the others in the network system. Si and Idi are unique to each other.

Next, the processing carried out at the center and at each station Ui is explained. First, the production of a center key in the center is explained. The center key is made to prepare for the processing in each station Ui.

Production of the center key

In the center, two different large prime numbers p, q are generated, and then the product $n=p \cdot q$ and the value $L=LCM((p-1),(q-1))$ which is the least common multiple of $(p-1)$ and $(q-1)$ are calculated. Thereafter, an integral number g is chosen as to be a generator of both a Galois field GF(p) and a Galois field GF(q) as to the prime numbers p and q. Also, an integral number u which is relatively prime with the value L is decided as a public key of the center, and a secret key v of the center corresponding to the public key u is produced. The key v satisfies the following equation;

$$u \cdot v \equiv 1 (\bmod L).$$

That is, the product $u \cdot v$ is congruent with 1 modulo the value L. In other words, the remainder provided by dividing the production $u \cdot v$ by the value L is equal to 1.

Next, the production of each station key in the center is explained.

Production of the station key

In the center, a pair of keys di, Si are determined for the station Ui as follows, and the keys are issued to the station Ui. The key di differs from the public key u and is relatively prime with the least common multiple L, and each key di is selected to satisfy the following equation:

$$di \neq dj \text{ when } i \neq j.$$

Thereafter, a secret key of the center ei is determined to satisfy the following equation:

$$ei \cdot di = 1 \pmod{L}.$$

Then, the secret information Si for authenticating the station is determined by using the secret key v as follows and issued to each station Ui:

$$Ii = h(IDi) \bmod n$$

$$Si = Ii^{-v} \bmod n.$$

Where h() is a pseudo random function and the value n is a common modulus in the cryptographic communication system.

Thereafter, public information Pi is determined by using modulo n, the predetermined values g, ei, and Si as follows:

$$Pi = Si \cdot g^{ei} \bmod n.$$

According to the above procedure for producing the center key and station key, the determined values are classified into the following three categories:
(1) public information: u, g, n, h(), Pi(i=1, ---, m)
(2) center secret information: v, p, q, L, ei(i=1, ---, m)
(3) station secret information: di, Si.
Where all of stations can be informed of the public information, only the center can be informed of the center secret information and it is kept a secret from each station, and only the center and the station Ui know the station secret information di, Si, which is kept a secret from the other stations. The station secret information di, Si is not required to be stored in the center after the information di, Si is issued to the station Ui. For example, the station secret information di, Si is stored in a secure memory medium and handed over to the station Ui.

The concrete key distribution processing is embodied by using the public information and the information distributed to each station Ui prepared as described above.

Now, before the specific description, an ID-based authentication method based on a zero-knowledge identification scheme which is closely related to the key distribution method according to the present invention will be described with reference to FIG. 6.

Figure 6:
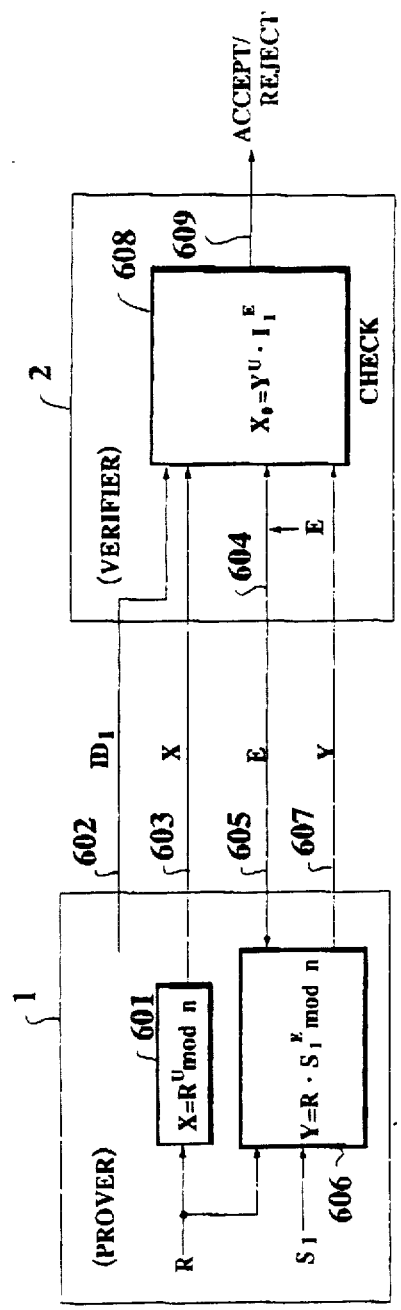
FIG. 6 shows schematically the extended Fiat-Shamir method.
Figure 7:
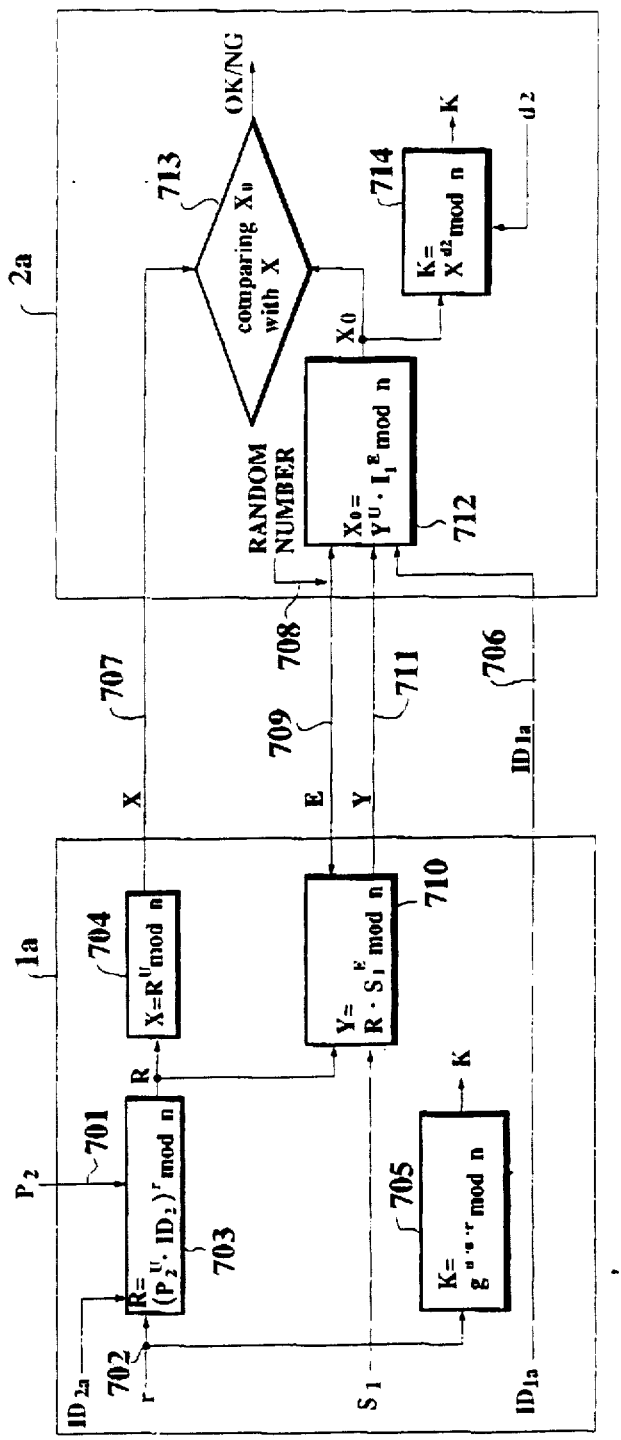
Figure 8:
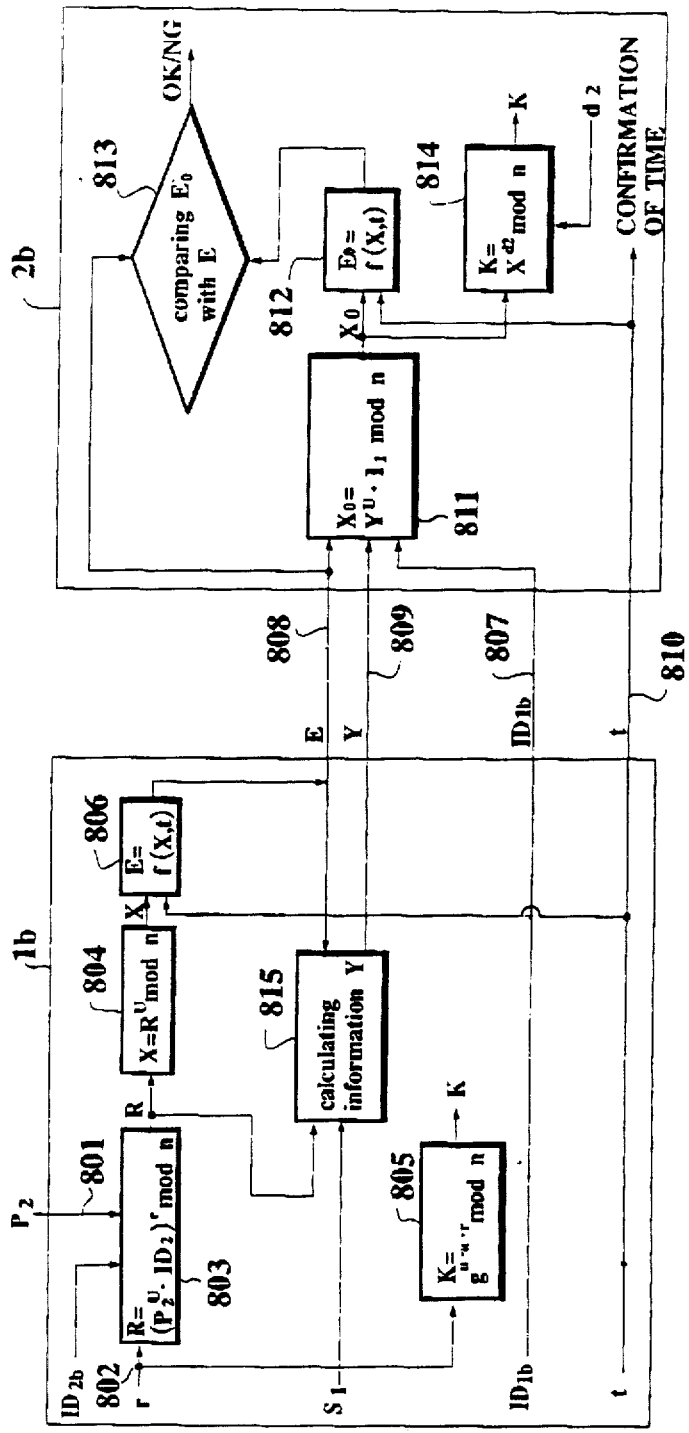
Figure 9:
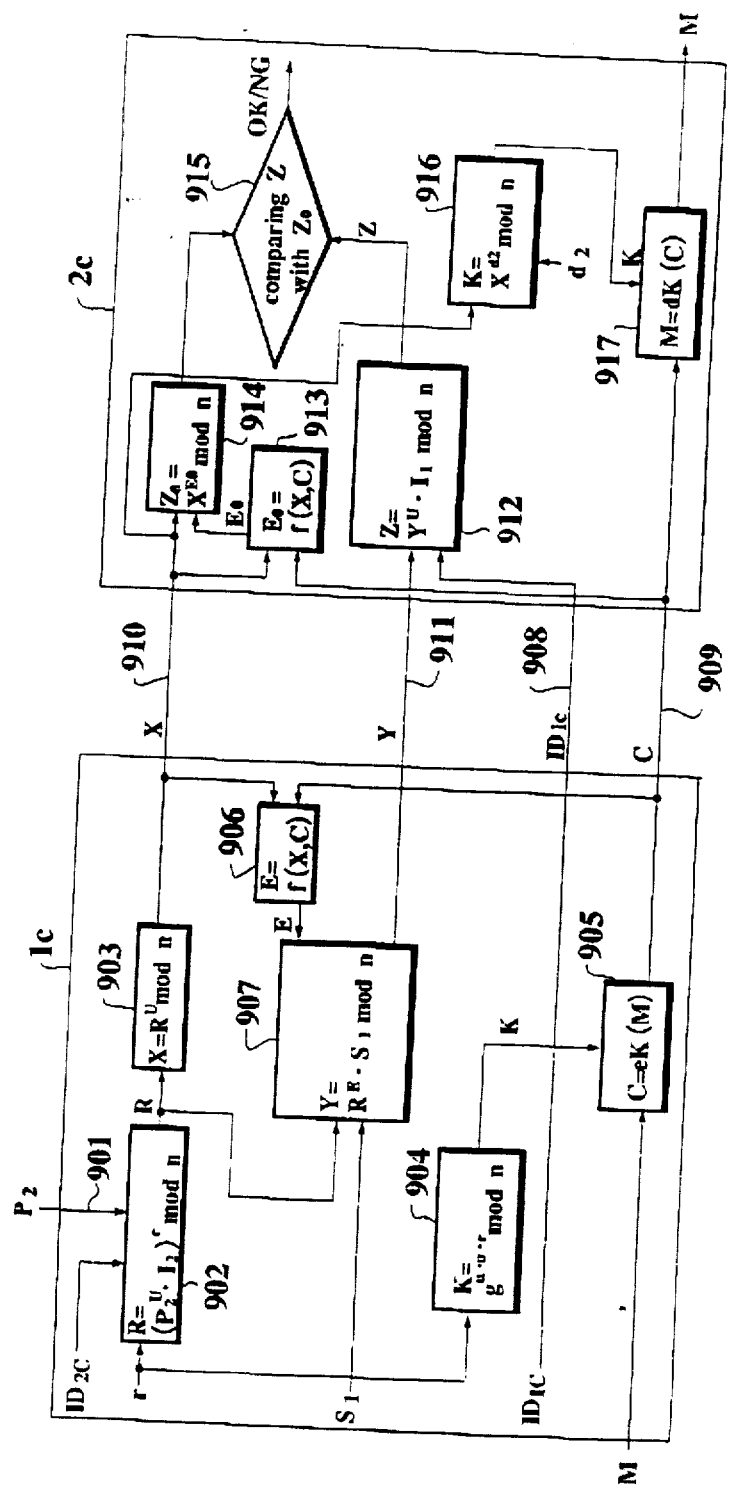
Figure 10:
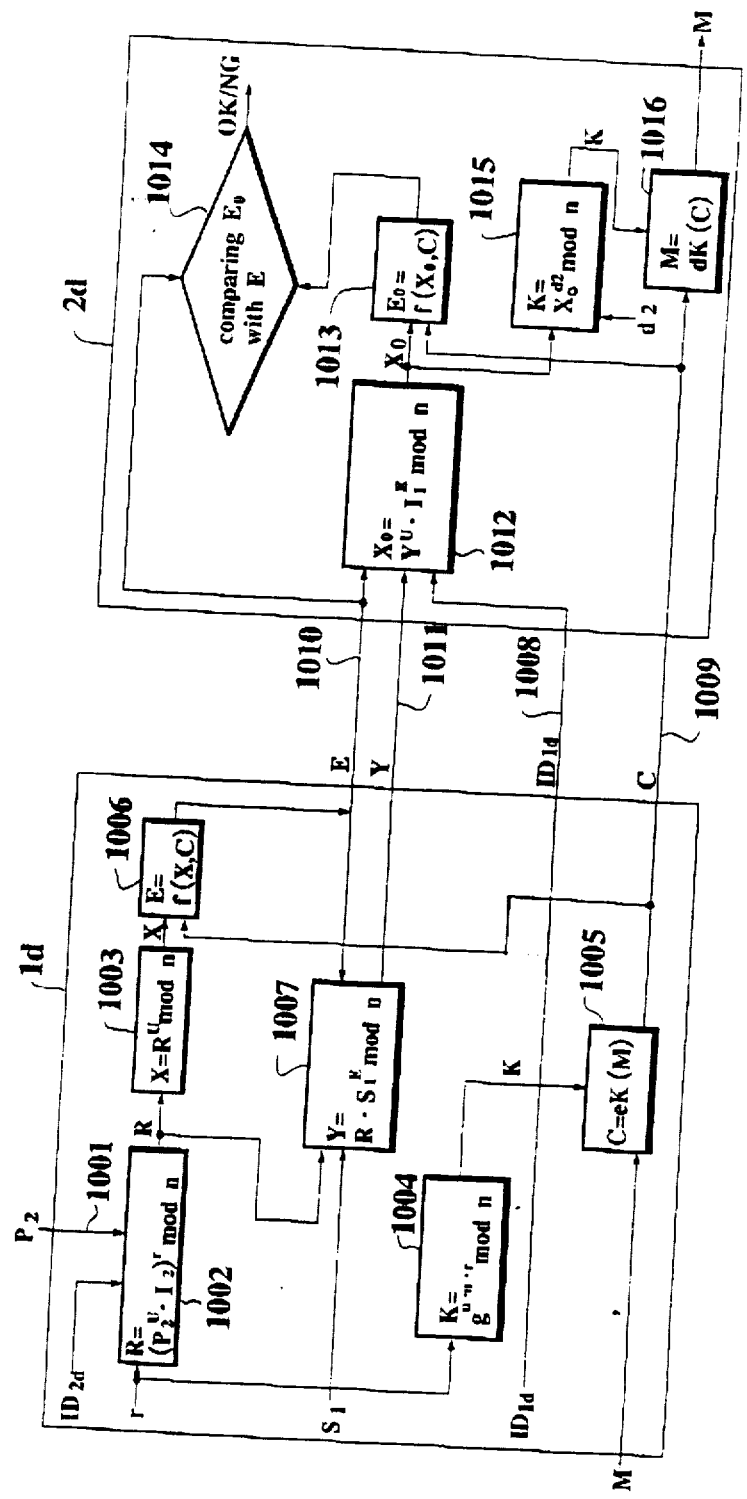
Figure 11:
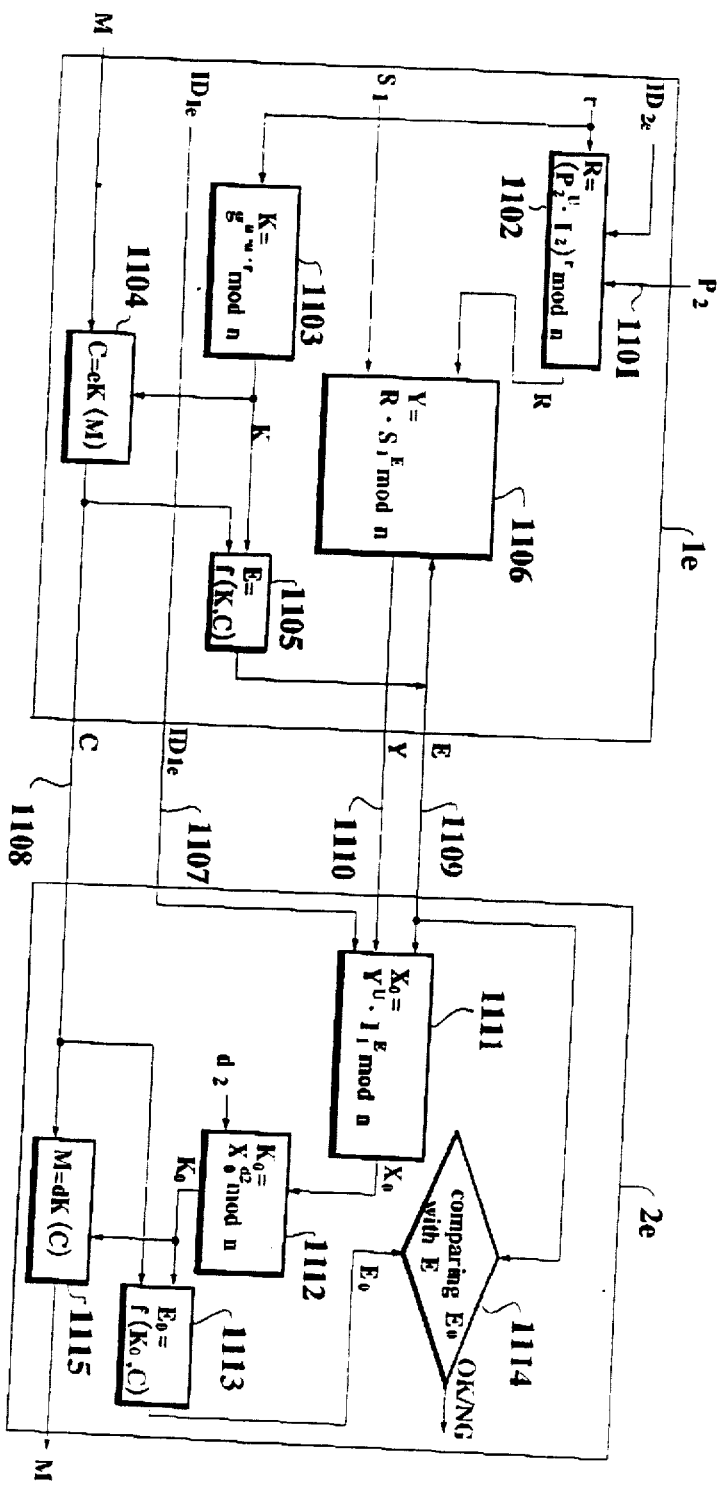
Figure 12:
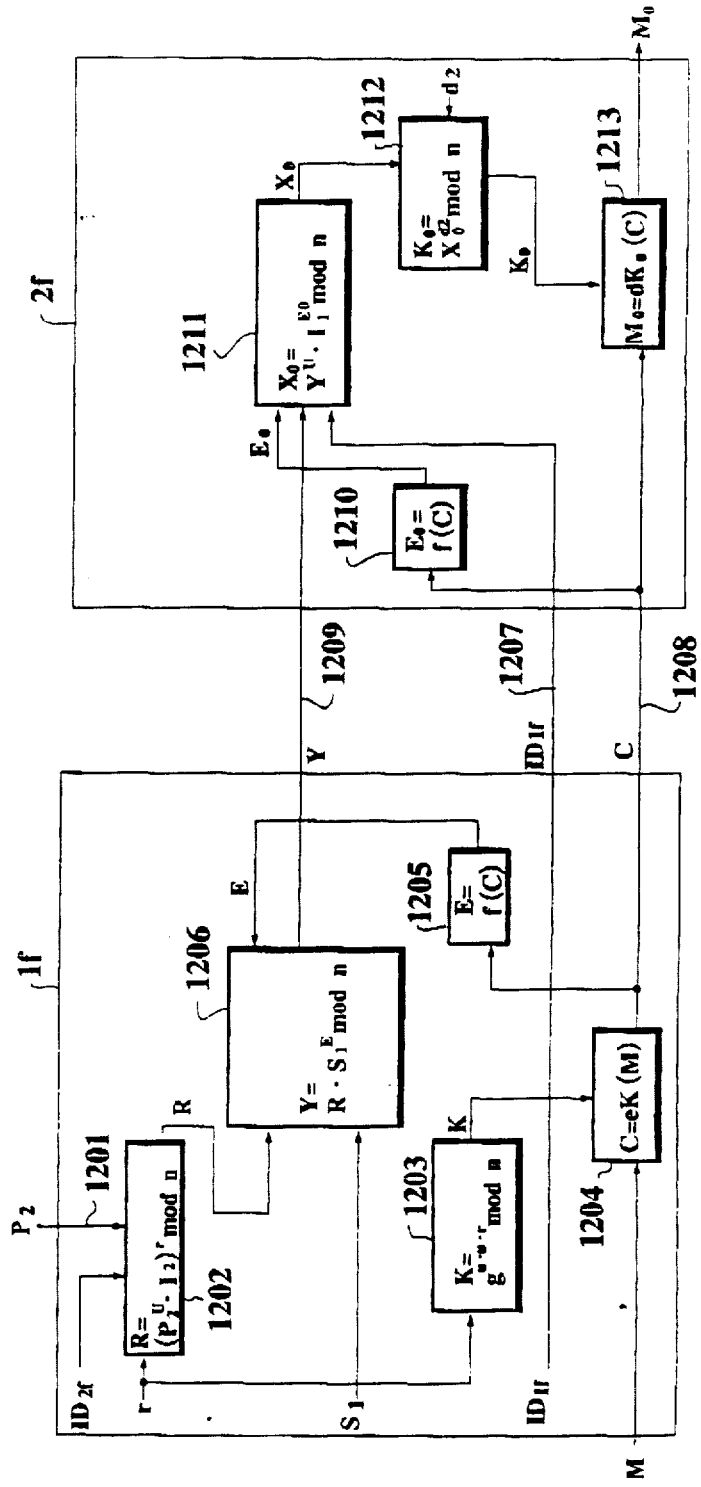

As shown in FIG. 6, a protocol for communicating between two persons is described. The aim of the protocol is that a prover station 1 proves to a verifier station 2 that the station 1 is issued the secret information Si corresponding to the IDi from the center.

According to the above protocol, if a third party eavesdrops on the communication between the prover station 1 and the verifier station 2, the eavesdropper can not know the secret information Si and the impersonation attack can not be carried out. As an example, one of the extended Fiat-Shamir method can be given. The method is described in the following literature:

K. Ohta and T. Okamoto, "A Modification of the Fiat-Shamir Scheme", Crypto 88, Lecture Note on Computer Science, Springer Verlag pp. 232–243.

Also, as examples of the practical zero-knowledge identification protocol proposed until now, there are four typical method as follows:

(1) Fiat-Shamir method

A. Fiat and A. Shamir, "How to prove yourself: practical solutions to identification and signature problems", Crypto 86, Lecture Note on Computer Science, Springer Verlag pp. 116-194,

(2) Extended Fiat-Shamir method 1

K. Ohta and T. Okamoto, "A Modification of the Fiat-Shamir Scheme", Crypto 88, Lecture Note on Computer Science, Springer Verlag pp. 232-243,

(3) Extended Fiat-Shamir method 2

K. Ohta "Authentication Method Based on ID Utilizing RSA Cryptograph and the Application of the Method", Pres. of the eleventh symposium on information theory and its application, pp. 567-572, December, 1988, and

(4) Beth method

T. Beth, "Efficient zero-knowledge identification scheme for smart cards, Eurorypt", 88, Lecture note on Computer Science, Springer Verlag pp. 232-243.

In each protocol, there are three types of usage as follows:
(a) sequential version,
(b) parallel version, and
(c) non-interactive version.

A detailed explanation for each version is omitted. The explanation for the configuration based on the extended Fiat-Shamir method 1 is made with reference to FIG. 6.

FIG. 6 shows the outline of the protocol in which the prover station 1 (designated by U1) authenticates the possession of the station secret information Si to the verifier station 2 (designated by U2).

Here, the processing in the prover station 1 is designated as
U1: {processing}.

The transmission of the information from the prover station 1 to the verifier station 2 is designated as follows:
U1→U2: {information}.

In addition, the other notation is used for the following embodiments as
{number}: {processing}.

Where number means the step of the processing.

Authentication protocol based on the extended Fiat-Shamir method 1

Generating a random number R and calculating information X as follows:
U1: $X = R^u \bmod n$ ---(step 601)
U1→U2: ID1, X ---(step 602, 603)
U2: generating a random number E ---(step 604)
U2→U1: E ---(step 605)
Calculating information Y as follows:
U1: $Y = R \cdot S1^E \bmod n$ ---(step 606)
U1→U2: Y ---(step 607)
Calculating X0 as follows:
U2: $X0 = Y^u \cdot I1^E$ ---(step 608)

X0 is compared with X and the verifier station 2 authenticates the sender as the true prover station 1 if X0 is equal to X. If X0 is not equal to X, the verifier station 2 does not authenticate the sender as the true prover station 1. ---(step 609)

Figure 7:
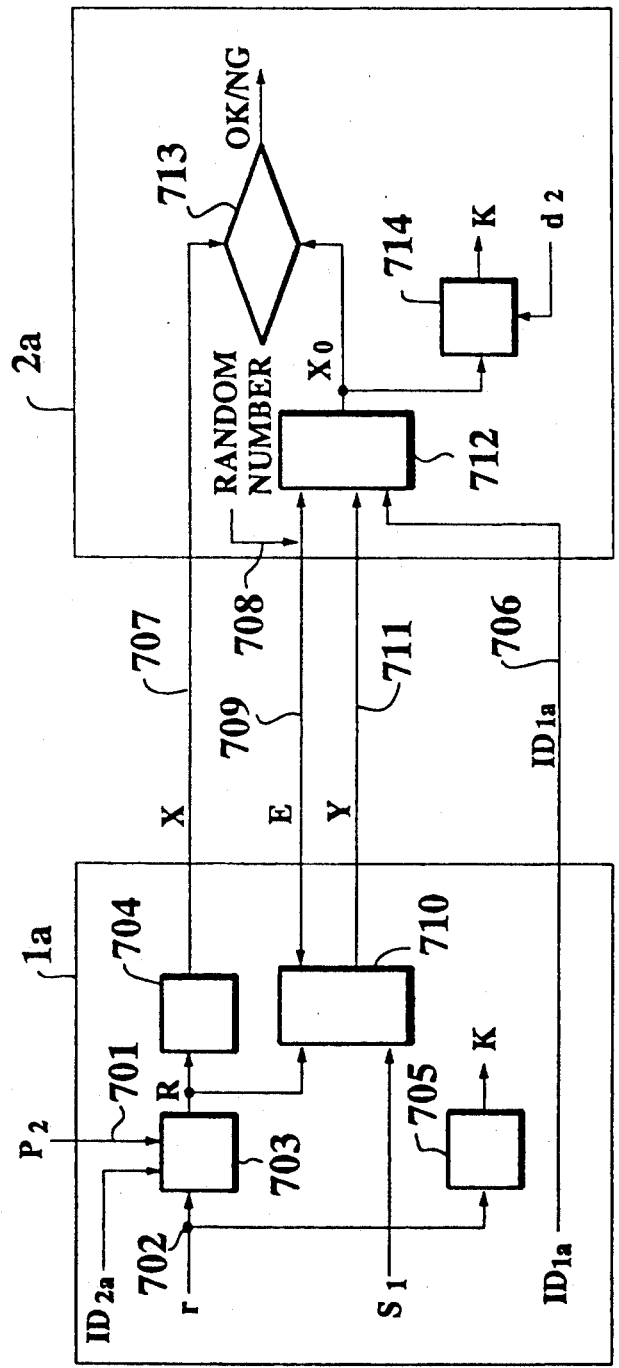
FIG. 7 is a block diagram showing a key distribution procedure of the first embodiment according to the present invention.

Now, a method and a device for distributing a key are described as a first embodiment according to the present invention with reference to FIG. 7 after the above preparation based on the conventional step.

The first embodiment corresponds to the claims 1, 3, and 6.

In the following description, the key distribution is described between the prover and the verifier in all embodiments for the sake of convenience.

The procedure of the method for sharing the key is as follows.

U1: Obtaining public information P2 of the verifier station 2 ---(step 701)

Generating a random number r ($1 \leq r \leq n-1$) ---(step 702)

Calculating a new random number R by using an identification number ID2 of the verifier station $2a$ and the public information P2 as follows:

$R = (P2^u \cdot ID2)^r \mod n$ ---(step 703)

Calculating the information X by using the new random number R as follows:

$X = R^u \mod n$. ---(step 704)

Producing a key K by using the random number r as follows $K = g^{u \cdot u \cdot r} \mod n$ ---(step 705)

Sending the identification number ID1 of the prover station $1a$ and the information X to the verifier station $2a$ as follows:

U1→U2: ID1, X ---(step 706, 707)
U2: generating a random number E ---(step 708)
U2→U1: E ---(step 709)

Calculating the information Y by using the secret information S1 of the prover station $1a$ and the random number R as follows:

U1: $Y = R \cdot S1^E \mod n$ ---(step 710)
U1→U2: Y ---(step 711)

Calculating the information X0 as follows:

U2: $X0 = Y^u \cdot I1^E \mod n$ ---(step 712)
Comparing X0 with X ---(step 713)

If X0 is not equal to X, a verifier station $2a$ does not authenticate a sender as a true prover station $1a$ and the processing in the verifier station $2a$ is stopped. If X0 is equal to X, the verifier station $2a$ authenticates the sender as the true prover station $1a$ and the key k is produced by using the information X and a secret key d2 of the verifier station $2a$ as follows:

$K = X^{d2} \mod n$. ---(step 714)

Accordingly, in the first embodiment, because the key-distribution-information Y is generated dependent on the random number E generated in the verifier station $2a$, it is very difficult for an eavesdropper to reuse the information Y for an impersonation attack.

Also, in the above method, because the communication from the receiver to the sender is included in the protocol, the method is not suitable for a non real time communication.

Next, a method and a device for sharing a common key as a second embodiment according to the present invention are described with reference to FIG. 8.

The second embodiment corresponds to the claims 1, 4, and 7.

Figure 8:
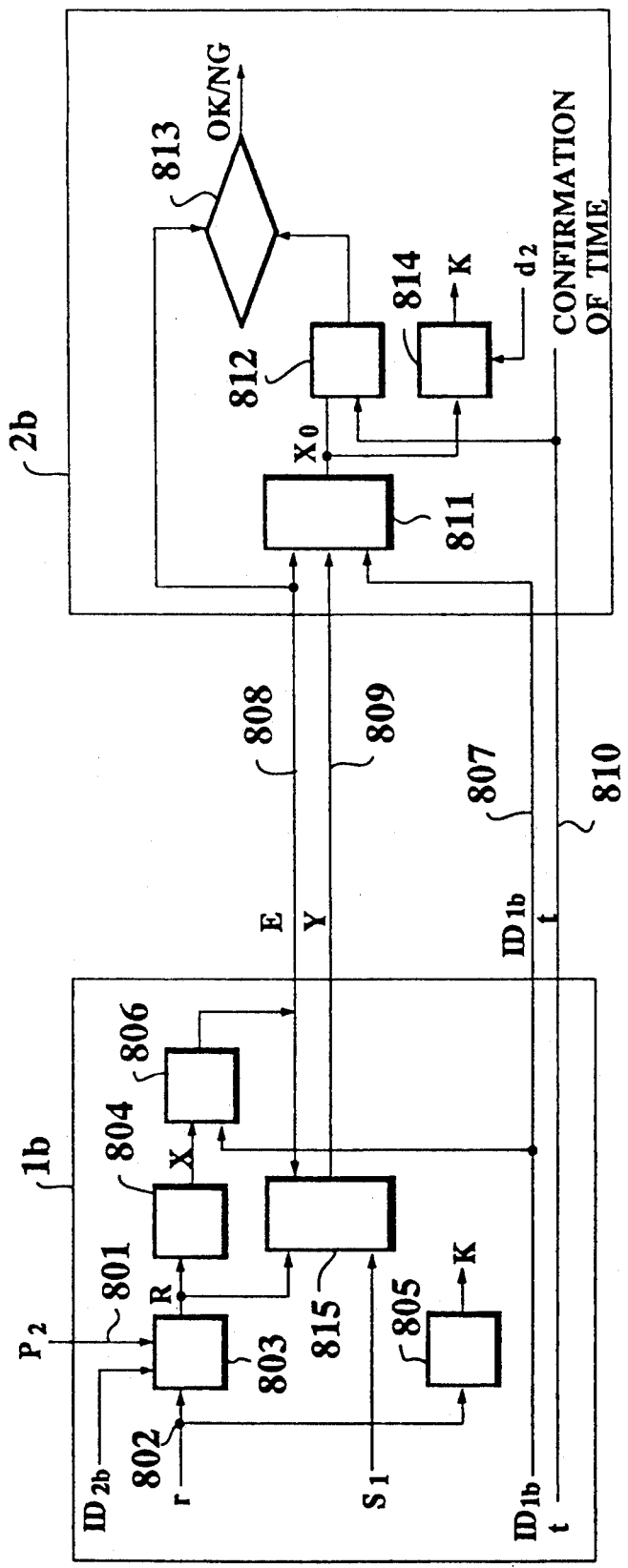
FIG. 8 is a block diagram showing a key distribution procedure of the second embodiment according to the present invention.

As shown in FIG. 8, the procedure of the key sharing method is as follows.

The processing in the Prover Station $1b$

1. Obtaining the public information P2 of a verifier station $2b$ ---(step 801)

Generating a random number r ($1 \leq r \leq n-1$) ---(step 802)

Calculating a new random number R by using an identification number ID2 of the verifier station $2b$, the public information P2, and the random number r as follows:

$R = (P2^u \cdot ID2)^r \mod n$ ---(step 803)

Calculating the information X by using the new random number R as follows:

$X = R^u \mod n$ ---(step 804)

Producing a key K by using the random number r as follows $K = g^{u \cdot u \cdot r} \mod n$ ---(step 805)

2. Calculating the key-distribution-information E by using the time information t and the information X as follows $E = f(X, t)$ ---(step 806)

3. Calculating information Y by using the secret information S1 of the prover station $1a$ and the random number R ---(step 815)

3. Sending ID2b, E, Y, t to the verifier station $2b$ ---(step 807, 808, 809, 810)

Processing in the Verifier Station $2b$

4. Calculating X0 as follows
$X0 = Y^u \cdot I1 \mod n$ ---(step 811)

5. When the difference between the time t and a time t' of a clock in the verifier station $2b$ is greater than a prescribed difference, the processing is stopped. On the other hand, when the difference is within the difference, E0 is calculated as follows:
$E0 = f(X, t)$. ---(step 812)

6. When E is not equal to E0, the verifier authenticates that the communication has not been carried out with the prover station $1b$ and stops the processing. On the other hand, when E is equal to E0, the verifier authenticates that the communication has been carried out with the prover station $1b$ and carries out the next processing step. ---(step 813)

7. Generating K by using X0 and a secret key d2 of the verifier station $2b$ as follows.

$K = X^{d2} \mod n$ ---(step 814)

The above method is a digital signature in the Fiat-Shamir method in which the key-distribution-information E, Y depend on the time t.

Accordingly, the verifier station $2b$ can authenticate that the key-distribution-information E, Y is produced at the time t in the prover station $1b$.

Also, because the key-distribution-information E, Y is valid in the condition that the information E, Y is used in combination with the time information t, the impersonation attack on the prover station $1b$ is prevented even if the attacker tries to abuse the information E, Y.

The effect that the impersonation attack is prevented in this method is valid in a communication system in which the difference between the sending time t and the receiving time t' is small enough. On the other hand, the effect of the above method is reduced in a communication system in which the difference between the sending time t and the receiving time t' is large. In other words, the effect of the above method is reduced in a communication system in which the transmission delay is large. However, there are many communication system such as telephone system in which the transmission delay is small. Therefore, the method and the device of the second embodiment are applicable to practical use.

Figure 9:
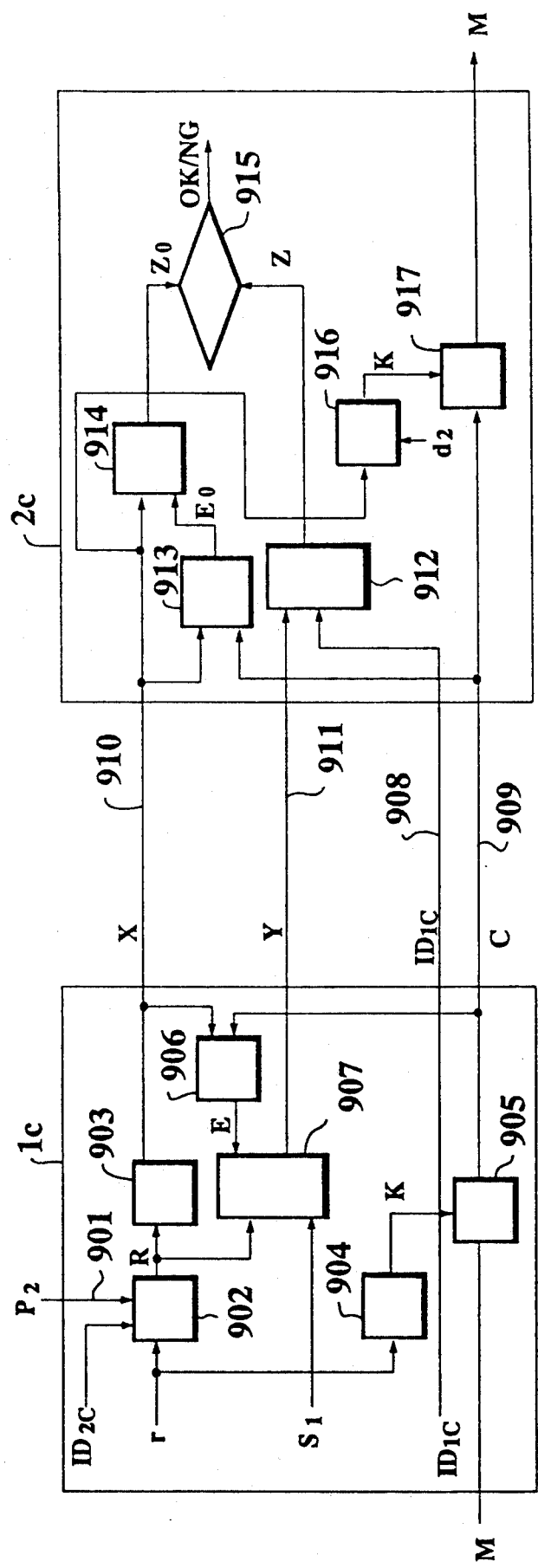
FIG. 9 is a block diagram showing a key distribution procedure of a third embodiment according to the present invention.

Next, a method and a device for authenticating a sender by using the extended Fiat-Shamir method 2 as a third embodiment according to the present invention are described with reference to FIG. 9.

The third embodiment corresponds to the claims 1, 2, and 5.

Hereinafter, the encryption procedure for producing a ciphertext C from a message M by using a cryptographic key K is represented by $C = eK(M)$.

On the other hand, the decryption procedure for generating the message M from the ciphertext C by using the cryptographic key K is represented by $M = dK(C)$.

First, the processing in a prover station $1c$ is described.

Processing in the Prover Station $1c$

1. Obtaining the public information P2 of a verifier station $2c$ ---(step 901)
2. Generating a random number r ($1 \leq r \leq n-1$), and calculating a random number R as follows:
$R = (P2^u \cdot I2)^r \bmod n$ ---(step 902)
calculating the key sharing information X as follows:
$X = R^u \bmod n$ ---(step 903)
calculating the cryptographic key K as follows:
$K = g^{u \cdot u \cdot r} \bmod n$ ---(step 904)
3. Producing a ciphertext C from a message M by using the key K as follows:
$C = eK(M)$ ---(step 905)
4. Calculating E as follows:
$E = f(X, C)$ ---(step 906)
5. Calculating additional key-distribution-information Y as follows
$Y = R^B \cdot S1 \bmod n$ ---(step 907)
6. Sending ID1c, C, X, and Y to the verifier station $2c$ ---(step 908, 909, 910, 911)

Next, the processing in the verifier station $2c$ is described.

The processing in the Verifier Station $2c$ 1. calculating Z as follows:
$Z = Y^u \cdot I1 \bmod n$ ---(step 912)
2. calculating E0 as follows:
$E0 = f(X, C)$ ---(step 913)
3. calculating Z0 as follows:
$Z0 = X^{B_0} \bmod n$ ---(step 914)
4. When Z is not equal to Z0, the verifier authenticates that the communication has not been carried out with the prover station $1c$ and stops the processing. On the other hand, when Z is equal to Z0, the verifier authenticates that the communication has been carried out with the prover station $1c$ and proceeds to the next processing step. ---(step 915)
5. Producing K from X by using a secret key d2 of the verifier station $2c$ as follows.
$K = X^{d2} \bmod n$ ---(step 916)
6. Obtaining the message M as follows
$M = dK(C)$ ---(step 917)

The key-distribution-information X, Y is an extended Fiat-Shamir signature for the ciphertext C in the above embodiment.

Accordingly, even if a ciphertext C', which differs from the true ciphertext C, is forged and sent to the verifier with the key-distribution-information X, Y by a third party to impersonate a true sender, the communication between the impersonator and the verifier is rejected by the verifier in the signature confirmation procedure because the signatures X, Y are not corresponding signatures for the forged ciphertext C', but the true ciphertext C. Therefore, the impersonation attack ends in failure.

The above method is realized by using the extended Fiat-Shamir method 2. However, the method can be also realized by the Fiat-Shamir method or the extended Fiat-Shamir method 1.

Figure 10:
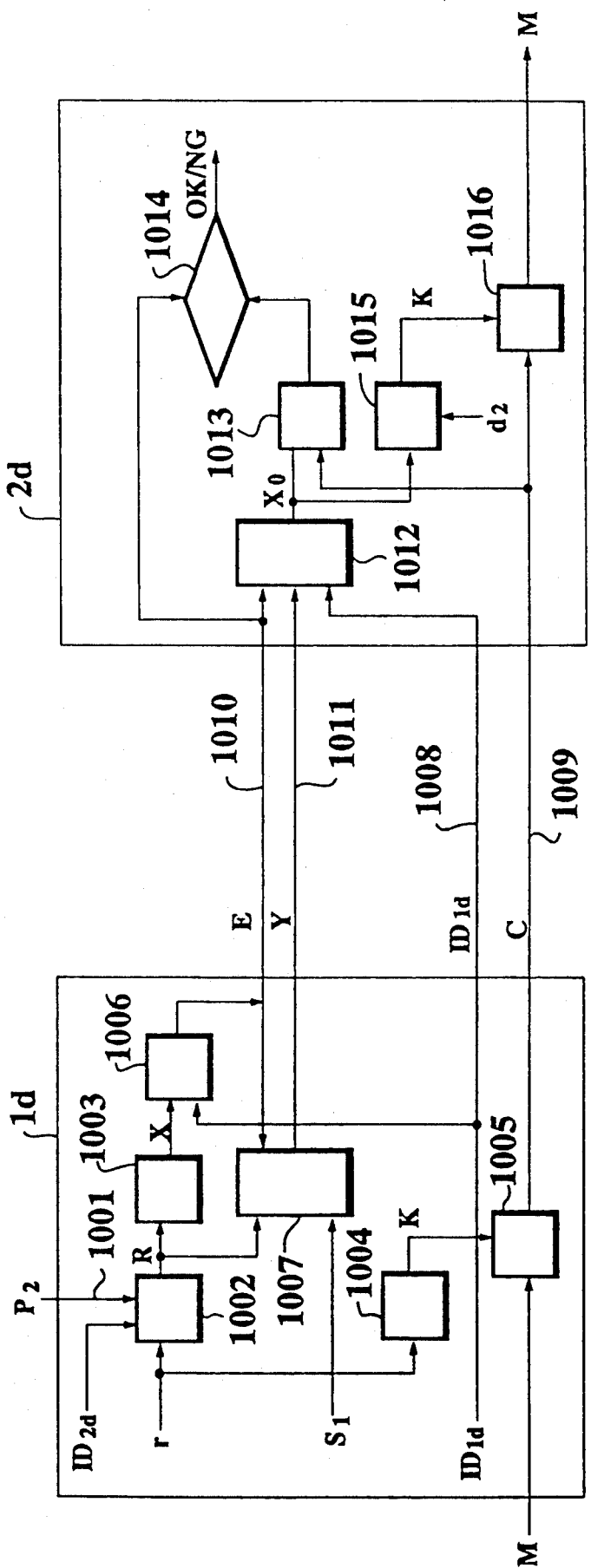
FIG. 10 is a block diagram showing a key distribution procedure of a fourth embodiment according to the present invention.

Next, a method and a device for authenticating a sender by using the extended Fiat-Shamir method 1 as a fourth embodiment according to the present invention are described with reference to FIG. 10.

The fourth embodiment corresponds to the claims 1, 2, and 5.

First, the procedure in a prover station $1d$ is described.

Procedure in the Prover Station $1d$

1. Obtaining public information P2 of a verifier station $2d$ ---(step 1001)
2. Generating a random number r ($1 \leq r \leq n-1$), and calculating a random number R:
$R = (P2^u \cdot I2)^r \bmod n$ ---(step 1002)
calculating the key-distribution-information X as follows:
$X = R^u \bmod n$ ---(step 1003)
calculating a cryptographic key K as follows:
$K = g^{u \cdot u \cdot r} \bmod n$ ---(step 1004)
3. Producing a ciphertext C from a message M by using the key K as follows:
$C = eK(M)$ ---(step 1005)
4. Calculating E as follows:
$E = f(X, C)$ ---(step 1006)
5. Calculating additional key-distribution-information Y as follows
$Y = R \cdot S1^B \bmod n$ ---(step 1007)
6. Sending ID1d, C, E, and Y to the verifier station $2d$ ---(step 1008, 1009, 1010, 1011)

Next, the processing in the verifier station $2d$ is described.

Processing in the Verifier Station $2d$

1. Calculating X0 as follows:
$X0 = Y^u \cdot I1^B \bmod n$ ---(step 1012)
2. Calculating E0 as follows:
$E0 = f(X0, C)$ ---(step 1013)
3. When X is not equal to X0, the verifier authenticates that the communication has not been carried out with the prover station $1d$ and stops the processing. On the other hand, when X is equal to X0, the verifier authenticates that the communication has been carried out with the prover station $1d$ and proceeds to the next processing step. ---(step 1014)
4. Producing K from X0 by using a secret key d2 of the verifier station $2d$ as follows.
$K = X^{d2} \bmod n$ ---(step 1015)
5. Obtaining the message M as follows
$M = dK(C)$ ---(step 1016)
6. The key-distribution-information E, Y is an extended Fiat-Shamir signature for the ciphertext C in the above embodiment.

Accordingly, it is impossible to use the information E, Y with another ciphertext C' which differs from the true ciphertext C in the same manner as the third embodiment.

Also, the amount of calculation in the both sending and receiving stations is almost the same as in the third embodiment. However, the key-distribution-information E is sent to the verifier station 2d at the step 1010 in the fourth embodiment, while the key-distribution-information X is sent to the verifier station 2c at the step 910 in the third embodiment. In general, the digit number of the value X is almost equal to the value of the modulus n. On the other hand, the digit number of the value E can be smaller than the value of the modulus n. Therefore, the amount of communication can be reduced in the fourth embodiment.

The above method and device are realized by using the extended Fiat-Shamir method 1. However, the method can be also realized by the Fiat-Shamir method.

Figure 11:
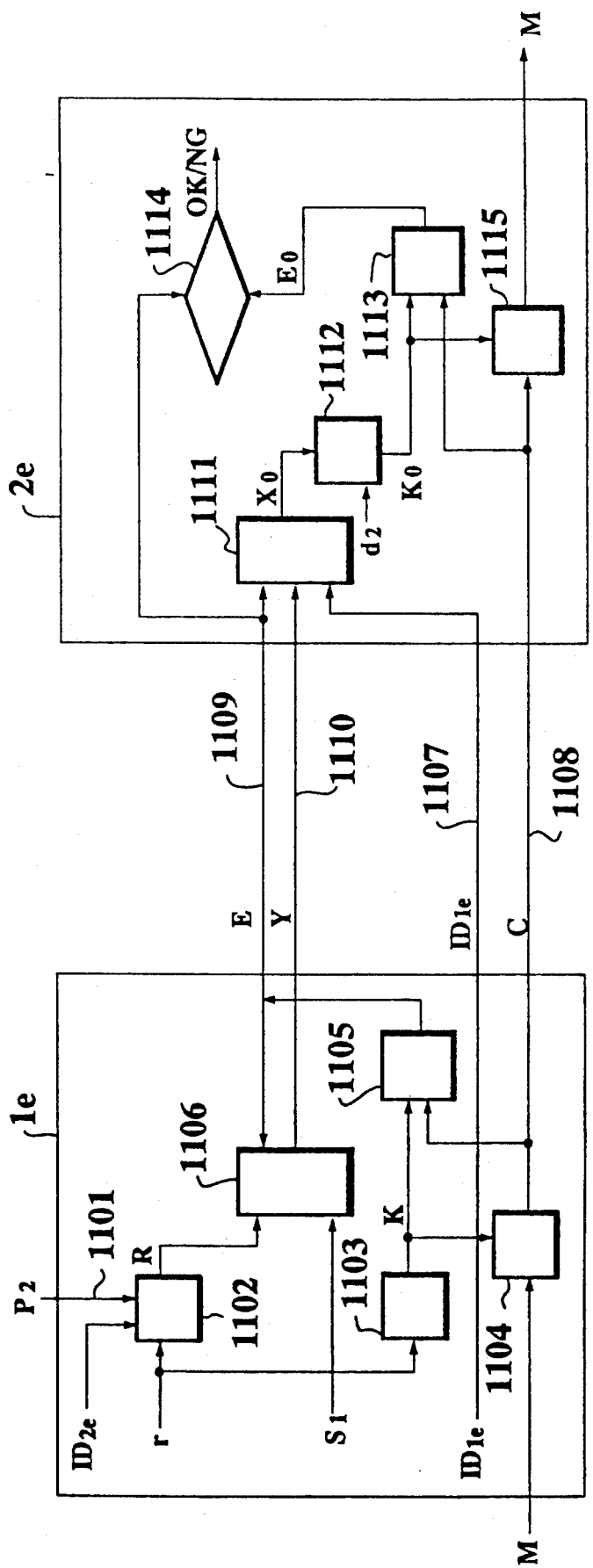
FIG. 11 is a block diagram showing a key distribution procedure of a fifth embodiment according to the present invention.

Next, a method and a device in which the amount of processing or communication is reduced is described as a fifth embodiment according to the present invention with reference to FIG. 11.

The fifth embodiment is a variation of the fourth embodiment. Therefore, the fifth embodiment can be embodied by using the extended Fiat-Shamir method 1 or the Fiat-Shamir method.

The fifth embodiment also corresponds to the claims 1, 2, and 5.

First, the procedure in a prover station 1e is described.

Procedure in the Prover Station 1e

1. Obtaining public information P2 of a verifier station 2e ---(step 1101)
2. Generating a random number r ($1 \leq r \leq n-1$), and calculating a random number R as follows:
$R = (P2^u \cdot I2)^r \mod n$ ---(step 1102)
calculating a cryptographic key K as follows:
$K = g^{u \cdot u \cdot r} \mod n$ ---(step 1103)
3. Producing a ciphertext C from a message M by using the key K as follows:
$C = eK(M)$ ---(step 1104)
4. Calculating E by using the key K and the ciphertext C as follows:
$E = f(K, C)$ ---(step 1105)
5. Calculating additional key-distribution-information Y by using the secret information S1 and the random number R as follows:
$Y = R \cdot S1^B \mod n$ ---(step 1106)
6. Sending ID1e, C, E, Y to the verifier station 2e ---(step 1107, 1108, 1109, 1110)

Next, the processing in the verifier station 2e is described.

Processing in the Verifier Station 2e

1. Calculating X0 as follows:
$X0 = Y^u \cdot I1^B \mod n$ ---(step 1111)
2. Producing K0 from X0 by using a secret key d2 of the verifier station 2e as follows.
$K0 = X0^{d2} \mod n$ ---(step 1112)
3. Calculating E0 as follows:
$E0 = f(K0, C)$ ---(step 1113)
4. When E is not equal to E0, the verifier authenticates that the communication has not been carried out with the prover station 1e and stops the processing. On the other hand, when E is equal to E0, the verifier authenticates that the communication has been carried out with the prover station 1e and proceeds to the next processing step. ---(step 1114)
5. Finding the message M as follows $M = dK(C)$ ---(step 1115)

Accordingly, because the information X produced in the prover station 1d at the fourth embodiment is omitted at the fifth embodiment, the amount of processing is reduced. The reduction is equivalent to one modular exponentiation calculation for multiple-length integral number. The amount of this calculation is generally large, therefore the processing time is effectively reduced.

Because X is not sent to the receiver, the information E is produced by the receiver from the key K and the ciphertext C. By taking account of $K = X^B \mod n$, the value E is rewritten as follows:
$E = f(K, C) = f(X^B \mod n, C) = f_o(X, C)$
where $f_o()$ is an one-way function.

Therefore, the security of this method is the same as in the fourth embodiment.

In the above mentioned embodiments from the third to the fifth, the key-distribution-information is produced to depend on the ciphertext C. However, even if the information is modified to depend on the message M, the impersonation attack carried out by resending the key-distribution-information is prevented in the similar manner as those embodiments.

For example, in the fifth embodiment, it is possible that the processing in the prover station 1e at the step 1105 be modified to the processing $E = f(K, M)$ though the corresponding modification of the procedure for the processing in the prover station 1e is needed,.

However, as described in the fifth embodiment, the configuration in which the key-distribution-information depends on the ciphertext C is superior to the other configuration in which the key-distribution-information depends on the message M. The reason is that the authentication of the true sender can be completed before decrypting the message M at the receiver (the verifier) in the former configuration. That is, the receiver can stop the processing before processing the useless decryption when a forged message M' is sent to the receiver.

Figure 12:
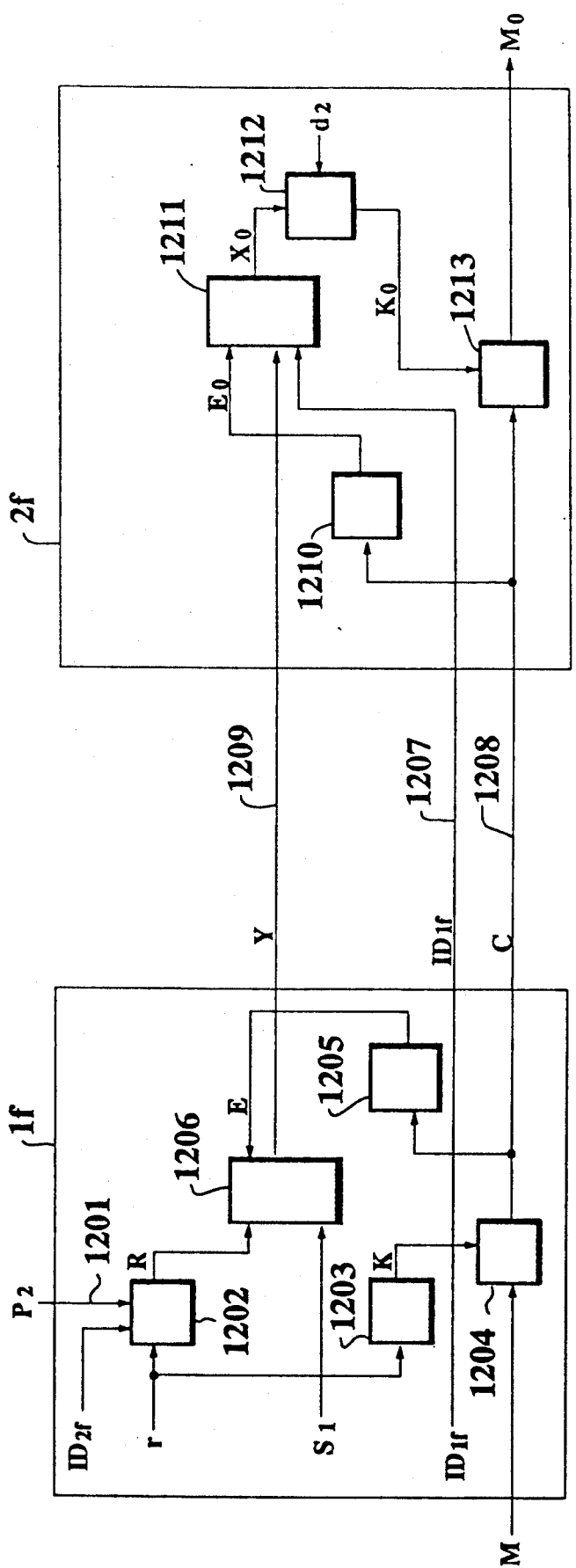
FIG. 12 is a block diagram showing a key distribution procedure of a sixth embodiment according to the present invention.

Next, a method and a device is described as a sixth embodiment according to the present invention with reference to FIG. 12. The sixth embodiment is the same as in the fifth embodiment in that the amount of processing or communication is reduced. The sixth embodiment is another variation of the fourth embodiment. Therefore, the sixth embodiment can be also embodied by using the extended Fiat-Shamir method 1 or the Fiat-Shamir method.

The sixth embodiment also corresponds to the claims 1, 2, and 5.

First, the procedure in a prover station 1f is described.

Procedure in the Prover Station 1f

1. Obtaining public information P2 of a verifier station 2f ---(step 1201)
2. Generating a random number r ($1 \leq r \leq n-1$) and calculating a random number R as follows:
$R = (P2^u \cdot I2)^r \mod n$ ---(step 1202)
calculating a cryptographic key K as follows:
$K = g^{u \cdot u \cdot r} \mod n$ ---(step 1203)
3. Generating a ciphertext C as follows:
$C = eK(M)$ ---(step 1204)
4. Calculating E as follows:
$E = f(C)$ ---(step 1205)
5. Calculating additional key-distribution-information Y as follows $Y = R \cdot S1^E \mod n$ ---(step 1206)

6. Sending ID1f, C, and Y to the verifier station 2f ---(step 1207, 1208, 1209)

Next, the processing in the verifier station 2f is described.

Processing in the Verifier Station 2f

1. Calculating EO as follows:
$EO = f(C)$ ---(step 1210)
2. Calculating XO as follows:
$XO = Y^u \cdot I1^{EO} \mod n$ ---(step 1211)
3. Producing KO from XO by using a secret key d2 of the verifier station 2f as follows.
$KO = XO^{d2} \mod n$ ---(step 1212)
4. Obtaining a message MO as follows
$MO = dKO(C)$ ---(step 1213)

Accordingly, in the sixth embodiment, because the information X produced in the prover station 1e of the fourth embodiment is omitted, the information E can be omitted as the key-distribution-information while reducing the amount of processing. Therefore, the reduction in both the processing and the communication is embodied.

Because X is not produced, the information E is generated from the ciphertext C. By taking account of $C = eK(M)$, the value E is rewritten as follows:
$E = f(C) = f_o(K, C)$
where $f_o()$ is a one-way function.

Therefore, the security of this method is the same as in the fourth embodiment if the correctness of the information EO can be authenticated at the verifier station. Though the correctness of the information EO is not conspicuously authenticated in the processing of the verifier station 2f, if the information EO differs from the information E produced in the prover station 1f, the difference influences the decrypted message MO so that the message MO decrypted in the verifier station 2f at the step 1213 is not identical with the transmitted message M. This influence may be utilized to detect the malicious attack. For example, when the message M is in the Japanese language, the attack is detected because the series of letters is meaningless.

In general, when a type of structural redundancy exists in the message M, the correctness of the information EO can be confirmed by confirming the existence of the redundancy in the decrypted message MO. That is, the prover station can be authenticated. If the structural redundancy should not exist in the message M, the redundancy can be added artificially. For example, a message authentication code, so-called MAC can be utilized as one method for adding the redundancy to the message M.

In the above all embodiments, the key distribution method is described. However, in the methods described in the third to sixth embodiments, the digital signature method based on the non-interactive version of the zero-knowledge identification protocol is utilized as the sender authentication mechanism so that the method can be utilized as the digital signature method.

Figure 13:
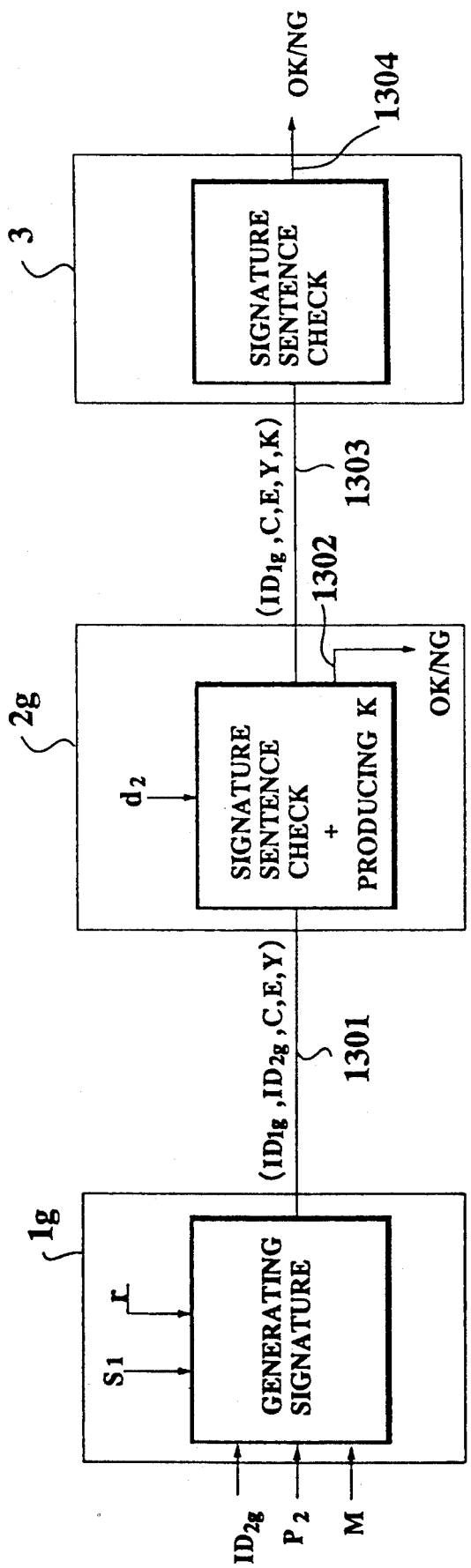
FIG. 13 is a block diagram showing a digital signature procedure of a seventh embodiment according to the present invention.
Figure 14:
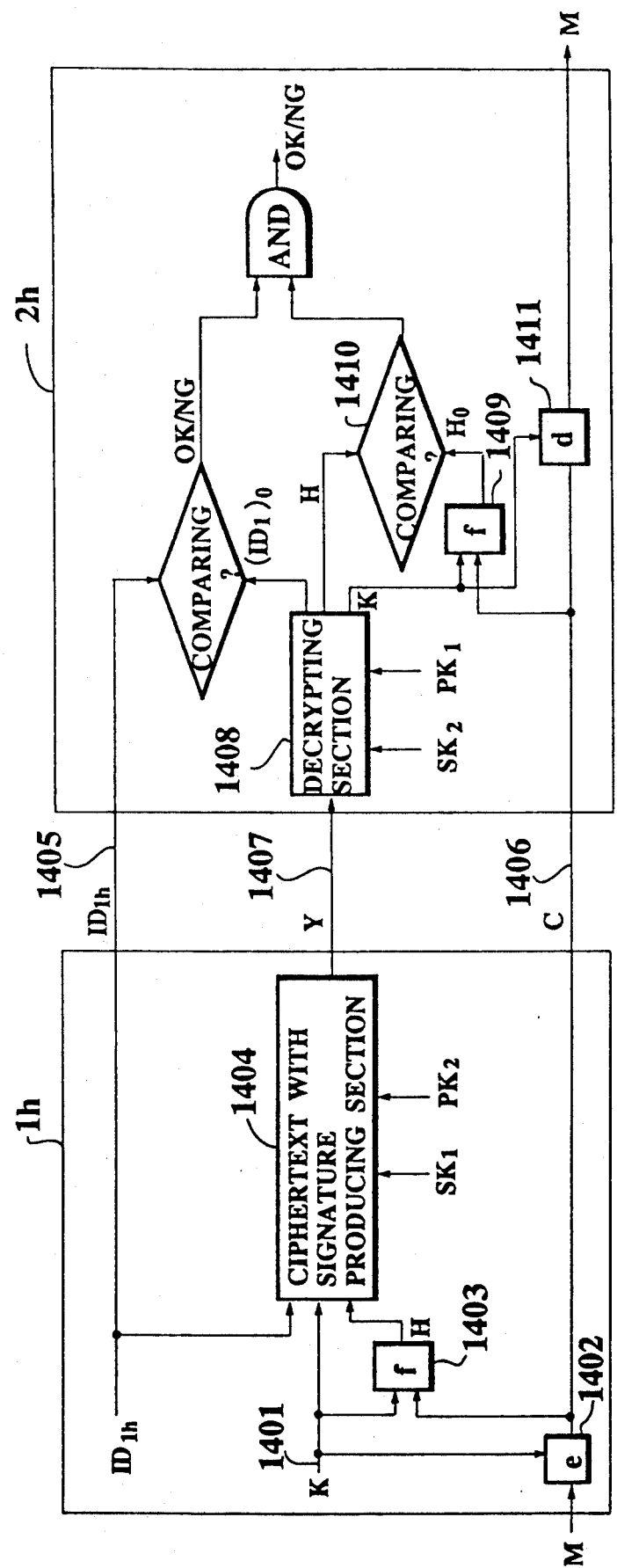
FIG. 14 is a block diagram showing a key distribution procedure of a eighth embodiment according to the present invention.

Therefore, the digital signature method with confidentiality will now be described as a seventh embodiment with reference to FIG. 13. The seventh embodiment is embodied by slightly modifying the third embodiment.

The seventh embodiment also corresponds to the claims 1, 2, and 5.

Digital Signature with Confidentiality

1. A prover station 1g produces a ciphertext 1 in the similar manner as in the third embodiment as follows:
$C = eK(M \parallel h(K \parallel M))$,
where the symbol $\parallel$ represents concatenation of two strings.

2. The prover station 1g sends the following digital signature sentence 1 to a verifier station 2g:
sentence 1: (ID1g, ID2g, C, E, Y), ---(step 1301)
where the information Y, E is produced in the same manner as the third embodiment.

3. The verifier station 2g produces a key k by using a secret key d2 in the same manner as in the third embodiment, and confirms that the message M has a precribed structure $(M \parallel h(K \parallel M))$ after decrypting the ciphertext C by using the cryptographic key K. ---(step 1302)

4. The verifier station 2g discloses the following digital signature sentence 2 to the other station 3 when the signature has to be confirmed by the station 3: sentence 2: (ID1g, C, E, Y, K). ---(step 1303)

5. The station 3 confirms the signature 2 according to the following judgement. ---(step 1304)

5-1. The information XO, EO is calculated as follows:
$XO = Y^u \cdot I1^E \mod n$
$EO = f(XO, C)$ 5-2. If E is equal to EO, the procedure goes on to the next step. If E is not equal to EO is not equal to EO, the station 3 judges that the signature sentence 1 has not been sent from the prover station 1g before stopping the processing.

5-3. The station 3 confirms that, after obtaining the message $MO = dK(C)$, the decrypted message MO has the prescribed structure $(M \parallel h(K \parallel M))$. If the message MO has no prescribed structure, the station 3 judges that the signature sentence 1 has not been sent from the prover station 1g before stopping the processing. If the message MO has the prescribed structure, the station 3 judges that the signature sentence 1 has been sent from the prover station 1g.

Accordingly, the signature sentence 1 can be authenticated only by the verifier station 2g so that the other station 3 can not authenticate the signature sentence 1 unless the right key K is disclosed or before step 1304. Therefore, when both the prover and verifier stations 1g, 2g keep a secret of the key K, those station can prevent a third party from running away with the signature sentence 1 without authorization.

Also, the significant feature in the above mentioned digital signature is as follows. The first feature is that the signature portion is the Fiat-Shamir type of mechanism. The second feature is that only a specific person (that is, the verifier station 2g in this embodiment) can authenticate the digital signature. The third feature is that the specific person is the first to be able to read the message M. The fourth feature is that anyone can confirm the signature sentence if the verifier station 2g authenticates the message M and the signature 1 and discloses the key K.

Because the signature sentence 2 being public with the right key K can be authenticated by anyone, the function of specifying the producer of the message M exists in the seventh embodiment in the same manner as in the conventional system.

In the above all embodiments for distributing the key, the zero-knowledge identification protocol is utilized as the basic mechanism. However, the present invention can be utilized for preventing a replay attack in the key distribution utilizing the generally public key cryptosystem.

Therefore, an eighth embodiment utilizing the RSA crypto system (R. L. Rivest, et.al, "A Method for Obtaining Public-Key Crypto Systems and Digital signatures", Comm. of ACM, pp. 120–126, February 1978) which is the representative public key cryptosystem, will now be described with reference to FIG. 14.

The eighth embodiment also corresponds to the claims 1, 2, and 5.

In the eighth embodiment, a public key of a arbitrary station is assumed to be registered in a special directory in which the key can not be falsified for simplicity. Symbols are defined as follows:

Encryption procedure using a public key of a station i:

$$C = PKi(M) = M^{A1} \bmod n_1$$

Decryption procedure using a secret key of a station i:

$$M = SKi(C) = C^{B1} \bmod n_1$$

Next, the processing in a prover station $1h$ is described.

Processing in the Prover Station $1h$

1. Generating a random number K and setting the number to a key K  ---(step 1401)
2. Encrypting a message M by using the key K as follows:
   $C = eK(M)$  ---(step 1402)
3. Calculating the hash value H of C and K as follows
   $H = f(C, K)$  ---(step 1403)
4. Calculating the key-distribution-information Y at a ciphertext with signature producing section as follows
   $Y = PK2 (SK1(ID1 \| K \| H))$  ---(step 1404)
5. Sending an identification number ID1h, a ciphertext C, and the information Y to a verifier station $2h$  ---(step 1405, 1406, 1407)

Next, the processing in a verifier station $2h$ is described.

Processing in the Verifier Station $2h$

1. Obtaining the decrypted information Z at a decryption section as follows:
   $Z = PK1(SK2(Y))$  ---(step 1408)

The verifier station $2h$ confirms that the number ID1h is included in the decrypted information Z according to a prescribed form. If the number ID1h is not included in the decrypted information Z, the processing is stopped.

2. Taking out the key K and the hash value H, and calculating as follows:
   $HO = f(C, K)$  ---(step 1409)
3. Confirming that the calculated hash value HO is identical with the hash value H  ---(step 1410)

If HO is not identical with H, the processing is stopped. Otherwise, the processing proceeds to the next step.

4. decrypting the ciphertext C by using the key K obtained at the step 1409 as follows:
   $M = dK(C)$  ---(step 1411)

In the above mentioned embodiment, the key-distribution-information is the signature of the sender for the ciphertext C in the similar manner as in the third to sixth embodiments when the key distribution method is carried out between two persons.

Accordingly, it is difficult for the key-distribution-information produced for some ciphertext C to be utilized by combining with the other ciphertext C'. That is, the eighth embodiment is effective for preventing an impersonation attack.

By using this embodiment, because the same key K can be securely sent to a plurality of receivers. Thus, the same key K is shared among a group of three or more persons. For example, when a plurality of receivers 2, 3, ---, k exist for a single sender 1, the sender 1 can send the ciphertext C to the all receivers according to the procedure in which the message is sent to a receiver i (i = 2, 3, ---, k) by using the public information Pi of the receiver i in the same manner as in the communication between two persons. In this case, because the key K being common for all receivers can be sent, the procedure for encrypting the message M is performed only once. Therefore, the time-consuming procedure for encrypting the message M is reduced to $1/(k=1)$ compared with the procedure in which the key sharing between two persons is repeated $(k=1)$ times.

Moreover, since the key-distribution-information depends on the ciphertext C, it is difficult for the receiver 2 to impersonate the sender 1 to send the other ciphertext C' to the other receiver 3 after the receiver 2 shares the key K among the group.

Though the eighth embodiment is described as to utilize the RSA crypto system, a new key distribution is embodied in the same manner as in the eighth embodiment if a public key cryptosystem which can realize both confidentiality and the digital signature are given.

To conclude, the sharing key is easily changed in all of the above embodiments as compared with the DH method. And, an impersonation attack can be prevented when the key is shared between two persons or among three or more persons, while the attack can be carried out by resending the message in the conventional method.

The impersonation attack can be prevented even in a non real time communication by adopting some methods according to the present invention and in a real time communication by adopting the other methods according to the present invention, while the key is easily shared between two persons or among three or more persons.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is;

1. A cryptographic communication method for carrying out cryptographic communication to transmit a message M from a sending station to a receiving station through a communication line by utilizing public information P2 of the receiving station, secret information S1 of the sending station, an identification number 101 of the sending station, and a secret key d2 of the receiving station, comprising the steps of;

obtaining the public information P2 in the sending station;

generating a first random number r in the sending station;

generating a second random number R according to a
prescribed procedure by utilizing both the public
information P2 and the first random number r in
the sending station;

generating a third random number X according to a
prescribed procedure by utilizing the second random number R in the sending station:

generating a cryptographic key K according to a
prescribed procedure by utilizing the first random
number r in the sending station:

producing a ciphertext C from the message M by
utilizing the cryptographic key K in the sending
station;

generating a first hashing result E by implementing a
one-way hashing to hash both the ciphertext C and
the third random number X in the sending station;

generating key-distribution-information Y according
to a prescribed procedure by utilizing the secret
information S1, the second random number R, and
the hashing result E in the sending station;

sending the third random number X, the identification number ID1, the ciphertext C, and the key-distribution-information Y to the receiving station
through the communication line:

generating a second hashing result EO by implementing the one-way hashing to hash both the ciphertext C and the third random number X in the receiving station;

restoring the cryptographic key K according to a
prescribed procedure by utilizing both the secret
key d2 and the third random number X in the receiving station; and obtaining the message M by decrypting the ciphertext
C by utilizing the cryptographic key K in the receiving station.

2. A cryptographic communication method for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising the steps of:

obtaining the public information P2 in the sending station;

generating a first random number r in the sending station;

generating a second random number R according to a
prescribed procedure by utilizing both the public
information P2 and the first random number r in
the sending station;

generating a third random number X according to a
prescribed procedure by utilizing the second random number R in the sending station:

generating a cryptographic key K according to a
prescribed procedure by utilizing the first random
number r in the sending station;

producing a ciphertext C from the message M by
utilizing the cryptographic key K in the sending
station;

generating a first hashing result E by implementing a
one-way hashing to hash both the ciphertext C and
the third random number X in the sending station;

generating key-distribution-information Y according
to a prescribed procedure by utilizing the secret
information S1, the second random number R, and
the hashing result E in the sending station:

sending the hashing result E, the identification number ID1, the ciphertext C, and the key-distribution-information Y to the receiving station through the communication line;

generating a fourth random number XO according to
a prescribed procedure by utilizing the hashing
result E, the key-distribution-information Y, and
the identification number ID1 in the receiving station:

generating a second hashing result EO by implementing the one-way hashing to hash both the ciphertext C and fourth random number XO in the receiving station;

restoring the cryptographic key K according to a
prescribed procedure by utilizing both the secret
key d2 and the fourth random number XO in the
receiving station; and obtaining the message M by decrypting the ciphertext
C by utilizing the cryptographic key K in the receiving station.

3. A cryptographic communication method for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising the steps of:

obtaining the public information P2 in the sending station;

generating a first random number r in the sending station;

generating a second random number R according to a
prescribed procedure by utilizing both the public
information P2 and the first random number r in
the sending station;

generating a cryptographic key K according to a
prescribed procedure by utilizing the first random
number r in the sending station;

producing a ciphertext C from the message M by
utilizing the cryptographic key K in the sending
station;

generating a first hashing result E by implementing a
one-way hashing to hash both the cryptographic
key K and the ciphertext C in the sending station;

generating key-distribution-information Y according
to a prescribed procedure by utilizing the secret
information S1, the second random number R, and
the hashing result E in the sending station;

sending the hashing result E, the identification number ID1, the ciphertext C, and the key-distribution-information Y to the receiving station through the communication line;

generating a fourth random number XO according to
a prescribed procedure by utilizing the hashing
result E, the identification number ID1, and the
key-distribution-information Y in the receiving station;

restoring the cryptographic key K according to a
prescribed procedure by utilizing the secret key d2
and the fourth random number XO in the receiving station;

generating a second hashing result EO by implementing the one-way hashing to hash both the ciphertext C and the cryptographic key K in the receiving station; and obtaining the message M by decrypting the ciphertext C by utilizing the cryptographic key K in the receiving station.

4. A cryptographic communication method for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising the steps of;

obtaining the public information P2 in the sending station;

generating a first random number r in the sending station;

generating a second random number R according to a prescribed procedure by utilizing both the public information P2 and the first random number r in the sending station;

generating a cryptographic key K according to a prescribed procedure by utilizing the first random number r in the sending station;

producing a ciphertext C from the message M by utilizing the cryptographic key K in the sending station:

generating a first hashing result E by implementing a one-way hashing to hash the ciphertext C in the sending station;

generating key-distribution-information Y according to a prescribed procedure by utilizing the secret information S1, the second random number R, and the hashing result E in the sending station;

sending the identification number ID1, the ciphertext C and the key-distribution-information Y to the receiving station through the communication line:

generating a second hashing result EO by implementing the one-way hashing to hash the ciphertext C in the receiving station;

generating a fourth random number XO according to a prescribed procedure by utilizing the second hashing result EO, the identification number ID1, and the key-distribution-information Y in the receiving station;

restoring the cryptographic key K according to a prescribed procedure by utilizing the secret key d2 and the fourth random number XO in the receiving station; and obtaining the message M by decrypting the ciphertext C by utilizing the cryptographic key K in the receiving station.

5. A cryptographic communication device for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising:

obtaining means in the sending station for obtaining the public information P2;

first generating means in the sending station for generating a first random number r;

second generating means in the sending station for generating a second random number R according to a prescribed procedure by utilizing both the public information P2 obtained by the obtaining means and the first random number r generated by the first generating means;

third generating means in the sending station for generating a third random number X according to a prescribed procedure by utilizing the second random number R generated by the second generating means;

fourth generating means in the sending station for generating a cryptographic key K according to a prescribed procedure by utilizing the first random number r generated by the first generating means;

producing means in the sending station for producing a ciphertext C from the message M by utilizing the cryptographic key K generated by the fourth generating means;

fifth generating means in the sending station for generating a first hashing result E by implementing a one-way hashing to hash both the ciphertext C produced by the producing means and the third random number X generated by the third generating means;

sixth generating means in the sending station for generating key-distribution-information Y according to a prescribed procedure by utilizing the secret information S1, the second random number R generated by the second generating means, and the hashing result E generated by the fifth generating means;

sending means for sending the third random number X generated by the third generating means, the identification number ID1, the ciphertext C produced by the producing means, and the key-distribution-information Y generated by the sixth generating means to the receiving station through the communication line;

seventh generating means in the receiving station for generating a second hashing result EO by implementing the one-way hashing to hash the ciphertext C and the third random number X sent by the sending means;

restoring means in the receiving station for restoring the cryptographic key K according to a prescribed procedure by utilizing the secret key d2 and the third random number X sent by the sending means; and obtaining means in the receiving station for obtaining the message M by decrypting the ciphertext C sent by the sending means by utilizing the cryptographic key K restored by the restoring means.

6. A cryptographic communication device for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising:

obtaining means in the sending station for obtaining the public information P2;

first generating means in the sending station for generating a first random number r;

second generating means in the sending station for generating a second random number R according to a prescribed procedure by utilizing both the public information P2 obtained by the obtaining means and the first random number r generated by the first generating means;

third generating means in the sending station for generating a third random number X according to a prescribed procedure by utilizing the second random number R generated by the second generating means;

fourth generating means in the sending station for generating a cryptographic key K according to a prescribed procedure by utilizing the first random number r generated by the first generating means;

producing means in the sending station for producing a ciphertext C from the message M by utilizing the cryptographic key K generated by the fourth generating means;

fifth generating means in the sending station for generating a first hashing result E by implementing a one-way hashing to hash both the ciphertext C produced by the producing means and the third random number X generated by the third generating means;

sixth generating means in the sending station for generating key-distribution-information Y according to a prescribed procedure by utilizing the secret information S1, the second random number R generated by the second generating means, and the hashing result E generated by the fifth generating means;

sending means for sending the first hashing result E generated by the fifth generating means, the identification number ID1, the ciphertext C produced by the producing means, and the key-distribution-information Y generated by the sixth generating means to the receiving station through the communcation line;

seventh generating means in the receiving station for generating a fourth random number XO according to a prescribed procedure by utilizing the hashing result E, the key-distribution-information Y, and the identification number ID1 sent by the sending means;

eighth generating means in the receiving station for generating a second hashing result EO by implementing the one-way hashing to hash the ciphertext C and the fourth random number XO sent by the sending means;

restoring means in the receiving station for restoring the cryptographic key K according to a prescribed procedure by utilizing the secret key d2 and the fourth random number XO sent by the sending means; and obtaining means in the receiving station for obtaining the message M by decrypting the ciphertext C sent by the sending means by utilizing the cryptographic key K restored by the restoring means.

7. A cryptographic communication device for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising:

obtaining means in the sending station for obtaining the public information P2;

first generating means in the sending station for generating a first random number r;

second generating means in the sending station for generating a second random number R according to a prescribed procedure by utilizing both the public information P2 obtained by the obtaining means and the first random number r generated by the first generating means:

third generating means in the sanding station for generating a cryptographic key K according to a prescribed procedure by utilizing the first random number r generated by the first generating means;

producing means in the sending station for producing a ciphertext C from the message M by utilizing the cryptographic key K generated by the third generating means;

fourth generating means in the sending station for generating a first hashing result E by implementing a one-way hashing to hash both the ciphertext C produced by the producing means and the cryptographic key K generated by the third generating means;

fifth generating means in the sending station for generating key-distribution-information Y according to a prescribed procedure by utilizing the secret information S1, the second random number R generated by the second generating means, and the hashing result E generated by the fourth generating means;

sending means for sending the first hashing result E generated by the fourth generating means, the identification number ID1, the ciphertext C produced by the producing means, and the key-distribution-information Y generated by the fifth generating means to the receiving station through the communication line;

sixth generating means in the receiving station for generating a fourth random number XO according to a prescribed procedure by utilizing the hashing result E, the key-distribution-information Y, and the identification number ID1 sent by the sending means;

restoring means in the receiving station for restoring the cryptographic key K according to a prescribed procedure by utilizing the secret key d2 and the fourth random number XO sent by the sending means: and seventh generating means in the receiving station for generating a second hashing result EO by implementing the one-way hashing to hash the ciphertext C sent by the sending means and the cryptographic key K restored in the restoring means;

obtaining means in the receiving station for obtaining the message M by decrypting the ciphertext C sent by the sending means by utilizing the cryptographic key K restored by the restoring means.

8. A cryptographic communication device for carrying out cryptographic communication to transmit a message M from a sending station to a receiving station through a communication line by utilizing public information P2 of the receiving station, secret information S1 of the sending station, an identification number ID1 of the sending station, and a secret key d2 of the receiving station, comprising:

obtaining means in the sending station for obtaining the public information P2;

first generating means in the sending station for generating a first random number r;

second generating means in the sending station for generating a second random number R according to a prescribed procedure by utilizing both the public information P2 obtained by the obtaining means and the first random number r generated by the first generating means;

third generating means in the sending station for generating a cryptographic key K according to a prescribed procedure by utilizing the first random number r generated by the first generating means;

producing means in the sending station for producing a ciphertext C from the message M by utilizing the cryptographic key K generated by the third generating means;

fourth generating means in the sending station for generating a first hashing result E by implementing a one-way hashing to hash the ciphertext C produced by the producing means:

fifth generating means in the sending station for generating key-distribution-information Y according to a prescribed procedure by utilizing the secret information S1, the second random number R generated by the second generating means, and the hashing result E generated by the fourth generating means;

sending means for sending the first hashing result E generated by the fourth generating means, the identification number ID1, the ciphertext C produced by the producing means, and the key-distribution-information Y generated by the fifth generating means to the receiving station through the communication line;

sixth generating means in the receiving station for generating a second hashing result EO by implementing the one-way hashing to hash the ciphertext C sent by the sending means;

seventh generating means in the receiving station for generating a fourth random number XO according to a prescribed procedure by utilizing the second hashing result EO generated by the sixth generating means, the key-distribution-information Y, and the identification number ID1 sent by the sending means;

restoring means in the receiving station for restoring the cryptographic key K according to a prescribed procedure by utilizing the secret key d2 sent by the sending means and the fourth random number XO generated by the seventh generating means; and obtaining means in the receiving station for obtaining the message M by decrypting the ciphertext C sent by the sending means by utilizing the cryptographic key X restored by the restoring means.

* * * * *

UNITED STATES PATENT AND TRADEMARK OFFICE
CERTIFICATE OF CORRECTION

PATENT NO. : 5,136,642

DATED : Aug 4, 1992

INVENTOR(S) : Shinichi Kawamura, et al

It is certified that error appears in the above-identified patent and that said Letters Patent is hereby corrected as shown below:

The Drawing sheets, consisting of Figs. 6-12, should be deleted to be replaced with the drawing sheets, consisting of Figs. 6-12, as shown on the attached page.

Signed and Sealed this

Twenty-third Day of February, 1993

Attest:

STEPHEN G. KUNIN

Attesting Officer

Acting Commissioner of Patents and Trademarks